(12) United States Patent
Huang et al.

(10) Patent No.: US 10,757,688 B2
(45) Date of Patent: Aug. 25, 2020

(54) METHOD FOR REPORTING CHANNEL STATUS AND DEVICE

(71) Applicant: Huawei Technologies Co., Ltd., Shenzhen, Guangdong (CN)

(72) Inventors: Qufang Huang, Shanghai (CN); Yuanjie Li, Shanghai (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 266 days.

(21) Appl. No.: 15/578,171

(22) PCT Filed: Feb. 4, 2015

(86) PCT No.: PCT/CN2015/072209
§ 371 (c)(1),
(2) Date: Nov. 29, 2017

(87) PCT Pub. No.: WO2016/123759
PCT Pub. Date: Aug. 11, 2016

(65) Prior Publication Data
US 2018/0167930 A1    Jun. 14, 2018

(51) Int. Cl.
*H04W 72/04* (2009.01)
*H04L 5/00* (2006.01)
(Continued)

(52) U.S. Cl.
CPC ........ *H04W 72/0413* (2013.01); *H04B 7/063* (2013.01); *H04B 7/0626* (2013.01);
(Continued)

(58) Field of Classification Search
CPC ..... H04B 7/0626; H04B 7/063; H04L 1/1887; H04L 5/001; H04L 5/0032; H04L 5/0053;
(Continued)

(56) References Cited

U.S. PATENT DOCUMENTS 9,509,462 B2 * 11/2016 Nagata .................. H04W 24/10
9,980,167 B2 * 5/2018 Lu ........................ H04L 5/0057
(Continued)

FOREIGN PATENT DOCUMENTS

CN       102118218 A    7/2011
CN       102356580 A    2/2012
(Continued)

OTHER PUBLICATIONS

Huawei et al.; "On CA enhancements supporting up to 32 component carriers"; 3GPP TSG RAN WG1 Meeting #80; R1-150390; Athens, Greece; Feb. 9-13, 2015; 10 pages.
(Continued)

*Primary Examiner* — Chi H Pham
*Assistant Examiner* — Weibin Huang
(74) *Attorney, Agent, or Firm* — Conley Rose, P.C.

(57) ABSTRACT

A method for reporting a channel status and a device are disclosed. A user equipment UE uses M cells to transmit data, and the method includes: transmitting, by the base station, configuration signaling to the UE, where the configuration signaling includes a reporting period of channel state information CSI of N cells in the M cells; transmitting, by the base station, channel status request signaling to the UE, where the channel status request signaling is used to instruct the UE to report the CSI of the N cells; and receiving, by the base station, CSI of a cell that is in the N cells and that is managed by the base station, where the CSI is transmitted by the UE according to the reporting period. A corresponding base station and a corresponding user equipment are further disclosed.

19 Claims, 8 Drawing Sheets

S101 — A base station transmits configuration signaling to a user equipment UE, where the configuration signaling includes a reporting period of channel state information CSI of N cells in M cells S102 — The base station transmits channel status request signaling to the UE, where the channel status request signaling is used to instruct the UE to report the CSI of the N cells in the M cells S103 — The base station receives CSI of a cell that is in the N cells and that is managed by the base station, where the CSI is transmitted by the UE according to the reporting period

(51) Int. Cl.
  *H04L 1/18* (2006.01)
  *H04B 7/06* (2006.01)
  *H04L 1/08* (2006.01)

(52) U.S. Cl.
  CPC ............ *H04L 1/1887* (2013.01); *H04L 5/001* (2013.01); *H04L 5/0032* (2013.01); *H04L 5/0053* (2013.01); *H04L 5/0057* (2013.01); *H04L 5/0085* (2013.01); *H04L 5/0096* (2013.01); *H04L 1/08* (2013.01); *H04L 5/0087* (2013.01); *H04L 5/0098* (2013.01)

(58) Field of Classification Search
  CPC ... H04L 5/0057; H04L 5/0085; H04L 5/0096; H04W 72/0413
  See application file for complete search history.

(56) References Cited

U.S. PATENT DOCUMENTS

| | | | |
|---|---|---|---|
| 2012/0002568 A1 | 1/2012 | Tiirola et al. | |
| 2012/0188976 A1* | 7/2012 | Kim | H04W 72/1289 370/329 |
| 2013/0044711 A1* | 2/2013 | Aiba | H04W 72/1289 370/329 |
| 2013/0114554 A1 | 5/2013 | Yang et al. | |
| 2013/0324140 A1* | 12/2013 | Kwon | H04J 11/0053 455/450 |
| 2014/0362792 A1 | 12/2014 | Cheng et al. | |
| 2015/0085770 A1 | 3/2015 | Nagata et al. | |
| 2015/0304092 A1* | 10/2015 | Hwang | H04L 5/14 370/280 |
| 2015/0319633 A1* | 11/2015 | Ji | H04W 24/10 370/252 |
| 2016/0037405 A1 | 2/2016 | Choi et al. | |
| 2016/0249338 A1* | 8/2016 | Hwang | H04L 1/1671 |
| 2017/0273027 A1* | 9/2017 | Kim | H04W 52/48 |
| 2018/0262377 A1* | 9/2018 | Liu | H04W 72/0413 |

FOREIGN PATENT DOCUMENTS

| | | |
|---|---|---|
| CN | 102412941 A | 4/2012 |
| CN | 104205926 A | 12/2014 |
| WO | 2014163448 A1 | 10/2014 |

OTHER PUBLICATIONS

Alcatel-Lucent Shanghai Bell et al.; "Enhancements to UL control signalling for up to 32 component carriers"; 3GPP TSG RAN WG1 Meeting #80; R1-150699; Athens, Greece; Feb. 9-13, 2015; 4 pages.

Huawei; "CQI Reporting at Activation"; 3GPP TSG-RAN WG2 Meeting #72bis; R2-110113; Dublin, Ireland; Jan. 17-21, 2011; 4 pages.

3GPP TSG RAN WG1 #80, R1-150473, Qualcomm Incorporated:"CSI feedback for up to 32 component carriers", XP050949004, Feb. 9-13, 2015, 2 pages.

Foreign Communication From a Counterpart Application, European Application No. 15880715.6, European Office Action dated Apr. 23, 2019, 7 pages.

* cited by examiner

METHOD FOR REPORTING CHANNEL STATUS AND DEVICE

CROSS-REFERENCE TO RELATED APPLICATIONS

This application is a national stage of International Application No. PCT/CN2015/072209, filed on Feb. 4, 2015, which is hereby incorporated by reference in its entirety.

TECHNICAL FIELD

The present invention relates to the field of communications technologies, and in particular, to a method for reporting a channel status and a device.

BACKGROUND

In communications technologies, a base station allocates, to each user equipment (UE) in advance, some dedicated resources for transmitting channel state information (CSI), so as to help the base station arrange downlink transmission.

With continuous evolution of a Long Term Evolution (LTE) technology, a quantity of cells that can be used by the UE is expanded in the 3rd Generation Partnership Project (3GPP), and an amount of CSI that needs to be reported by the UE increases accordingly.

Currently, the UE reports CSI in two manners: periodic CSI reporting and aperiodic CSI reporting.

In the periodic CSI reporting, a reporting interval is generally long, and consequently, the base station cannot learn of a channel status of the UE in a timely manner, resulting in low spectrum efficiency. In addition, a large quantity of physical uplink control channel (PUCCH) resources are consumed in this manner.

In the aperiodic CSI reporting, the base station needs to continuously allocate dynamic physical uplink shared channel (PUSCH) resources to the UE, and instructs the UE to transmit CSI together with data. Even if there is no uplink data to be transmitted, the UE still needs to perform this operation. Consequently, a large quantity of PUSCH resources are consumed in this manner. If the UE needs to transmit a large amount of downlink data but little uplink data, a large quantity of physical downlink control channel (PDCCH) resources and PUSCH resources need to be consumed to transmit CSI.

Therefore, when the UE uses a large quantity of cells, how the base station can reliably obtain, in a timely manner with low costs, CSI that is of a cell and that is reported by the UE, and can efficiently arrange sending of downlink data is a problem that currently needs to be resolved.

SUMMARY

Embodiments of the present invention provide a method for reporting a channel status and a device, so that a base station can reliably obtain, in a timely manner with low costs, a channel status that is of a cell and that is reported by UE, and can efficiently arrange sending of downlink data.

According to a first aspect, a method for reporting a channel status is provided, where a user equipment UE uses M cells to transmit data, and the method includes:

transmitting, by the base station, configuration signaling to the UE, where the configuration signaling includes a reporting period of channel state information CSI of N cells in the M cells;

transmitting, by the base station, channel status request signaling to the UE, where the channel status request signaling is used to instruct the UE to report the CSI of the N cells in the M cells; and receiving, by the base station, CSI of a cell that is in the N cells and that is managed by the base station, where the CSI is transmitted by the UE according to the reporting period; and M is an integer greater than 1, N is an integer greater than or equal to 1, and N≤M.

With reference to the first aspect, in a first possible implementation, the configuration signaling further includes information indicating that the N cells in the M cells are configured as a group and a group identifier of the group; and the transmitted channel status request signaling specifically includes the group identifier.

With reference to the first aspect or the first possible implementation of the first aspect, in a second possible implementation, each of the M cells has one index identifier, the index identifier is specified in a logic sequence, the channel status request signaling specifically includes an index identifier of one of the M cells, and the N cells are N consecutive activated cells, starting from a cell indicated by the index identifier, indicated in the index identifier logic sequence.

With reference to the first aspect, the first possible implementation of the first aspect, or the second possible implementation of the first aspect, in a third possible implementation, the channel status request signaling further includes a physical resource block PRB and a modulation and coding scheme that are required to report the CSI of the N cells in the M cells; and the receiving, by the base station, CSI of a cell that is in the N cells and that is managed by the base station, where the CSI is transmitted by the UE according to the reporting period includes:

receiving, by the base station, the CSI of the cell that is in the N cells and that is managed by the base station, where the CSI is transmitted by the UE on the PRB according to the reporting period by using the modulation and coding scheme.

With reference to the first aspect, the first possible implementation of the first aspect, the second possible implementation of the first aspect, or the third possible implementation of the first aspect, in a fourth possible implementation, the channel status request signaling is channel status request signaling scrambled by using a semi-persistent scheduling-temporary identifier SPS-RNTI.

With reference to the first aspect, the first possible implementation of the first aspect, the second possible implementation of the first aspect, the third possible implementation of the first aspect, or the fourth possible implementation of the first aspect, in a fifth possible implementation, if at least one cell that is in the N cells and that is managed by the base station is deactivated in any reporting period, a value of CSI that is of the at least one cell and that is received by the base station is a preset value, and the preset value is used to indicate that the at least one cell is deactivated.

With reference to the first aspect, the first possible implementation of the first aspect, the second possible implementation of the first aspect, the third possible implementation of the first aspect, the fourth possible implementation of the first aspect, or the fifth possible implementation of the first aspect, in a sixth possible implementation, the method further includes:

retransmitting, by the base station, the channel status request signaling to the UE; and receiving, by the base station, CSI of a cell that is in the N cells other than the deactivated cell and that is managed by the base station, where the CSI is transmitted by the UE according to the reporting period.

With reference to the first aspect, the first possible implementation of the first aspect, the second possible implementation of the first aspect, the third possible implementation of the first aspect, the fourth possible implementation of the first aspect, the fifth possible implementation of the first aspect, or the sixth possible implementation of the first aspect, in a seventh possible implementation, if all the N cells are deactivated in any reporting period, the method further includes:

sending, by the base station, channel status reporting stop signaling to the UE, where the channel status reporting stop signaling is used to instruct the UE to stop reporting the CSI of the N cells.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, or the seventh possible implementation of the first aspect, in an eighth possible implementation, if all the N cells are deactivated in any reporting period, the method further includes:

receiving, by the base station, uplink data transmitted by the UE on the PRB.

According to a second aspect, a method for reporting a channel status is provided, where a user equipment UE uses M cells to transmit data, and the method includes:

receiving, by the UE, configuration signaling transmitted by the base station, where the configuration signaling includes a reporting period of channel state information CSI of N cells in the M cells;

receiving, by the UE, channel status request signaling transmitted by the base station, where the channel status request signaling is used to instruct the UE to report the CSI of the N cells in the M cells; and transmitting, by the UE to the base station according to the reporting period, CSI of a cell that is in the N cells and that is managed by the base station, where M is an integer greater than 1, N is an integer greater than or equal to 1, and N≤M.

With reference to the second aspect, in a first possible implementation, the configuration signaling further includes information indicating that the N cells in the M cells are configured as a group and a group identifier of the group; and the transmitted channel status request signaling specifically includes the group identifier.

With reference to the second aspect or the first possible implementation of the second aspect, in a second possible implementation, each of the M cells has one index identifier, the index identifier is specified in a logic sequence, the channel status request signaling specifically includes an index identifier of one of the M cells, and the N cells are N consecutive activated cells, starting from a cell indicated by the index identifier, indicated in the index identifier logic sequence.

With reference to the second aspect, the first possible implementation of the second aspect, or the second possible implementation of the second aspect, in a third possible implementation, the channel status request signaling further includes a physical resource block PRB and a modulation and coding scheme that are required to report the CSI of the N cells in the M cells; and the transmitting, by the UE to the base station according to the reporting period, CSI of a cell that is in the N cells and that is managed by the base station includes:

transmitting, by the UE to the base station on the PRB according to the reporting period by using the modulation and coding scheme, the CSI of the cell that is in the N cells and that is managed by the base station.

With reference to the second aspect, the first possible implementation of the second aspect, the second possible implementation of the second aspect, or the third possible implementation of the second aspect, in a fourth possible implementation, the channel status request signaling is channel status request signaling scrambled by using a semi-persistent scheduling-temporary identifier SPS-RNTI.

With reference to the second aspect, the first possible implementation of the second aspect, the second possible implementation of the second aspect, the third possible implementation of the second aspect, or the fourth possible implementation of the second aspect, in a fifth possible implementation, the method further includes:

receiving, by the UE, an instruction that is used to deactivate at least one of the N cells and that is transmitted by the base station; and the transmitting, by the UE to the base station according to the reporting period, CSI of a cell that is in the N cells and that is managed by the base station includes:

transmitting, by the UE to the base station according to the reporting period, the CSI of the cell that is in the N cells and that is managed by the base station, where a value of reported CSI of the at least one deactivated cell is a preset value, and the preset value is used to indicate that the at least one cell is deactivated.

With reference to the second aspect, the first possible implementation of the second aspect, the second possible implementation of the second aspect, the third possible implementation of the second aspect, the fourth possible implementation of the second aspect, or the fifth possible implementation of the second aspect, in a sixth possible implementation, the method further includes:

receiving, by the UE, the channel status request signaling retransmitted by the base station; and transmitting, by the UE to the base station according to the reporting period, CSI of a cell that is in the N cells other than the deactivated cell and that is managed by the base station.

With reference to the second aspect, the first possible implementation of the second aspect, the second possible implementation of the second aspect, the third possible implementation of the second aspect, the fourth possible implementation of the second aspect, the fifth possible implementation of the second aspect, or the sixth possible implementation of the second aspect, in a seventh possible implementation, if all the N cells are deactivated in any reporting period, the method further includes:

stopping, by the UE, transmitting the CSI of the N cells to the base station;

from a next period of any reporting period, starting, by the UE, to continuously count a quantity of times of skipping transmitting, to the base station in each reporting period, the CSI of the cell that is in the N cells and that is managed by the base station; and when a value of the counting reaches a first specified threshold, if the UE receives the channel status request signaling transmitted by the base station, and the N cells are activated, terminating, by the UE to the base station, transmission of the CSI of the cell that is in the N cells and that is managed by the base station to the base station.

With reference to the second aspect, the first possible implementation of the second aspect, the second possible implementation of the second aspect, the third possible implementation of the second aspect, the fourth possible implementation of the second aspect, the fifth possible implementation of the second aspect, or the sixth possible implementation of the second aspect, in a seventh possible implementation, the method further includes:

transmitting, by the UE, uplink data to the base station on the PRB;

continuously counting, by the UE, a quantity of times of transmitting uplink data to the base station; and when a value of the counting reaches a second specified threshold, determining, by the UE, that the base station cancels the allocated PRB resource.

According to a third aspect, a base station is provided, where a user equipment UE uses M cells to transmit data, and the base station includes a sending unit and a receiving unit, where the sending unit is configured to transmit configuration signaling to the UE, where the configuration signaling includes a reporting period of channel state information CSI of N cells in the M cells;

the sending unit is further configured to transmit channel status request signaling to the UE, where the channel status request signaling is used to instruct the UE to report the CSI of the N cells in the M cells; and the receiving unit is configured to receive CSI of a cell that is in the N cells and that is managed by the base station, where the CSI is transmitted by the UE according to the reporting period; and M is an integer greater than 1, N is an integer greater than or equal to 1, and N≤M.

With reference to the third aspect, in a first possible implementation, the configuration signaling further includes information indicating that the N cells in the M cells are configured as a group and a group identifier of the group; and the transmitted channel status request signaling specifically includes the group identifier.

With reference to the third aspect or the first possible implementation of the third aspect, in a second possible implementation, each of the M cells has one index identifier, the index identifier is specified in a logic sequence, the channel status request signaling specifically includes an index identifier of one of the M cells, and the N cells are N consecutive activated cells, starting from a cell indicated by the index identifier, indicated in the index identifier logic sequence.

With reference to the third aspect, the first possible implementation of the third aspect, or the second possible implementation of the third aspect, in a third possible implementation, the channel status request signaling further includes a physical resource block PRB and a modulation and coding scheme that are required to report the CSI of the N cells in the M cells; and the receiving unit is specifically configured to receive the CSI of the cell that is in the N cells and that is managed by the base station, where the CSI is transmitted by the UE on the PRB according to the reporting period by using the modulation and coding scheme.

With reference to the third aspect, the first possible implementation of the third aspect, the second possible implementation of the third aspect, or the third possible implementation of the third aspect, in a fourth possible implementation, the channel status request signaling is channel status request signaling scrambled by using a semi-persistent scheduling-temporary identifier SPS-RNTI.

With reference to the third aspect, the first possible implementation of the third aspect, the second possible implementation of the third aspect, the third possible implementation of the third aspect, or the fourth possible implementation of the third aspect, in a fifth possible implementation, if at least one cell that is in the N cells and that is managed by the base station is deactivated in any reporting period, a value of CSI that is of the at least one cell and that is received by the receiving unit is a preset value, and the preset value is used to indicate that the at least one cell is deactivated.

With reference to the third aspect, the first possible implementation of the third aspect, the second possible implementation of the third aspect, the third possible implementation of the third aspect, the fourth possible implementation of the third aspect, or the fifth possible implementation of the third aspect, in a sixth possible implementation, the sending unit is further configured to retransmit the channel status request signaling to the UE; and the receiving unit is further configured to receive CSI that is of a cell in the N cells other than the deactivated cell and that is transmitted by the UE according to the reporting period.

With reference to the third aspect, the first possible implementation of the third aspect, the second possible implementation of the third aspect, the third possible implementation of the third aspect, the fourth possible implementation of the third aspect, the fifth possible implementation of the third aspect, or the sixth possible implementation of the third aspect, in a seventh possible implementation, if all the N cells are deactivated in any reporting period, the sending unit is further configured to send channel status reporting stop signaling to the UE, where the channel status reporting stop signaling is used to instruct the UE to stop reporting the CSI of the N cells.

With reference to the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect, or the seventh possible implementation of the third aspect, in an eighth possible implementation, if all the N cells are deactivated in any reporting period, the receiving unit is further configured to receive uplink data transmitted by the UE on the PRB.

According to a fourth aspect, a user equipment is provided, where the user equipment UE uses M cells to transmit data, and the user equipment includes a receiving unit and a sending unit, where the receiving unit is configured to receive configuration signaling transmitted by the base station, where the configuration signaling includes a reporting period of channel state information CSI of N cells in the M cells;

the receiving unit is further configured to receive channel status request signaling transmitted by the base station, where the channel status request signaling is used to instruct the UE to report the CSI of the N cells in the M cells; and the sending unit is configured to transmit, to the base station according to the reporting period, CSI of a cell that is in the N cells and that is managed by the base station, where M is an integer greater than 1, N is an integer greater than or equal to 1, and N≤M.

With reference to the fourth aspect, in a first possible implementation, the configuration signaling further includes information indicating that the N cells in the M cells are configured as a group and a group identifier of the group; and the transmitted channel status request signaling specifically includes the group identifier.

With reference to the fourth aspect or the first possible implementation of the fourth aspect, in a second possible implementation, each of the M cells has one index identifier, the index identifier is specified in a logic sequence, the channel status request signaling specifically includes an index identifier of one of the M cells, and the N cells are N consecutive activated cells, starting from a cell indicated by the index identifier, indicated in the index identifier logic sequence.

With reference to the fourth aspect, the first possible implementation of the fourth aspect, or the second possible implementation of the fourth aspect, in a third possible implementation, the channel status request signaling further includes a physical resource block PRB and a modulation and coding scheme that are required to report the CSI of the N cells in the M cells; and the sending unit is specifically configured to transmit, to the base station on the PRB according to the reporting period by using the modulation and coding scheme, the CSI of the cell that is in the N cells and that is managed by the base station.

With reference to the fourth aspect, the first possible implementation of the fourth aspect, the second possible implementation of the fourth aspect, or the third possible implementation of the fourth aspect, in a fourth possible implementation, the channel status request signaling is channel status request signaling scrambled by using a semi-persistent scheduling-temporary identifier SPS-RNTI.

With reference to the fourth aspect, the first possible implementation of the fourth aspect, the second possible implementation of the fourth aspect, the third possible implementation of the fourth aspect, or the fourth possible implementation of the fourth aspect, in a fifth possible implementation, the receiving unit is further configured to receive an instruction that is used to deactivate at least one of the N cells and that is transmitted by the base station; and the sending unit is specifically configured to transmit, to the base station according to the reporting period, the CSI of the cell that is in the N cells and that is managed by the base station, where a value of reported CSI of the at least one deactivated cell is a preset value, and the preset value is used to indicate that the at least one cell is deactivated.

With reference to the fourth aspect, the first possible implementation of the fourth aspect, the second possible implementation of the fourth aspect, the third possible implementation of the fourth aspect, the fourth possible implementation of the fourth aspect, or the fifth possible implementation of the fourth aspect, in a sixth possible implementation, the receiving unit is further configured to receive the channel status request signaling retransmitted by the base station; and the sending unit is further configured to transmit CSI of a cell in the N cells other than the deactivated cell to the base station according to the reporting period.

With reference to the fourth aspect, the first possible implementation of the fourth aspect, the second possible implementation of the fourth aspect, the third possible implementation of the fourth aspect, the fourth possible implementation of the fourth aspect, the fifth possible implementation of the fourth aspect, or the sixth possible implementation of the fourth aspect, in a seventh possible implementation, if all the N cells are deactivated in any reporting period, the sending unit is further configured to stop transmitting the CSI of the N cells to the base station;

the user equipment further includes: a processing unit, where the processing unit is configured to: from a next period of any reporting period, start to continuously count a quantity of times of skipping transmitting, to the base station in each reporting period, the CSI of the cell that is in the N cells and that is managed by the base station; and the sending unit is further configured to: when a value of the counting reaches a first specified threshold, if the receiving unit receives the channel status request signaling transmitted by the base station, and the N cells are activated, terminate transmission of the CSI of the cell that is in the N cells and that is managed by the base station to the base station.

With reference to the fourth aspect, the first possible implementation of the fourth aspect, the second possible implementation of the fourth aspect, the third possible implementation of the fourth aspect, the fourth possible implementation of the fourth aspect, the fifth possible implementation of the fourth aspect, the sixth possible implementation of the fourth aspect, or the seventh possible implementation of the fourth aspect, in an eighth possible implementation, the sending unit is further configured to transmit uplink data to the base station on the PRB; and the processing unit is further configured to: continuously count a quantity of times of transmitting uplink data to the base station; and when a value of the counting reaches a second specified threshold, determine that the base station cancels the allocated PRB resource.

According to a fifth aspect, a base station is provided, where a user equipment UE uses M cells to transmit data, and the base station includes a transmitter and a receiver, where the transmitter transmits configuration signaling to the UE, where the configuration signaling includes a reporting period of channel state information CSI of N cells in the M cells;

the transmitter further transmits channel status request signaling to the UE, where the channel status request signaling is used to instruct the UE to report the CSI of the N cells in the M cells; and the receiver receives CSI of a cell that is in the N cells and that is managed by the base station, where the CSI is transmitted by the UE according to the reporting period; and M is an integer greater than 1, N is an integer greater than or equal to 1, and NM.

With reference to the fifth aspect, in a first possible implementation, the configuration signaling further includes information indicating that the N cells in the M cells are configured as a group and a group identifier of the group; and the transmitted channel status request signaling specifically includes the group identifier.

With reference to the fifth aspect or the first possible implementation of the fifth aspect, in a second possible implementation, each of the M cells has one index identifier, the index identifier is specified in a logic sequence, the channel status request signaling specifically includes an index identifier of one of the M cells, and the N cells are N consecutive activated cells, starting from a cell indicated by the index identifier, indicated in the index identifier logic sequence.

With reference to the fifth aspect, the first possible implementation of the fifth aspect, or the second possible implementation of the fifth aspect, in a third possible implementation, the channel status request signaling further includes a physical resource block PRB and a modulation and coding scheme that are required to report the CSI of the N cells in the M cells; and that the receiver performs the step of receiving CSI of a cell that is in the N cells and that is managed by the base station, where the CSI is transmitted by the UE according to the reporting period includes:

receiving the CSI of the cell that is in the N cells and that is managed by the base station, where the CSI is transmitted by the UE on the PRB according to the reporting period by using the modulation and coding scheme.

With reference to the fifth aspect, the first possible implementation of the fifth aspect, the second possible implementation of the fifth aspect, or the third possible implementation of the fifth aspect, in a fourth possible implementation, the channel status request signaling is channel status request signaling scrambled by using a semi-persistent scheduling-temporary identifier SPS-RNTI.

With reference to the fifth aspect, the first possible implementation of the fifth aspect, the second possible implementation of the fifth aspect, the third possible implementation of the fifth aspect, or the fourth possible implementation of the fifth aspect, in a fifth possible implementation, if at least one cell that is in the N cells and that is managed by the base station is deactivated in any reporting period, a value of CSI that is of the at least one cell and that is received by the base station is a preset value, and the preset value is used to indicate that the at least one cell is deactivated.

With reference to the fifth aspect, the first possible implementation of the fifth aspect, the second possible implementation of the fifth aspect, the third possible implementation of the fifth aspect, the fourth possible implementation of the fifth aspect, or the fifth possible implementation of the fifth aspect, in a sixth possible implementation, the transmitter retransmits the channel status request signaling to the UE; and the receiver receives CSI of a cell that is in the N cells other than the deactivated cell and that is managed by the base station, where the CSI is transmitted by the UE according to the reporting period.

With reference to the fifth aspect, the first possible implementation of the fifth aspect, the second possible implementation of the fifth aspect, the third possible implementation of the fifth aspect, the fourth possible implementation of the fifth aspect, the fifth possible implementation of the fifth aspect, or the sixth possible implementation of the fifth aspect, in a seventh possible implementation, if all the N cells are deactivated in any reporting period, the transmitter sends channel status reporting stop signaling to the UE, where the channel status reporting stop signaling is used to instruct the UE to stop reporting the CSI of the N cells.

With reference to the fifth aspect, the first possible implementation of the fifth aspect, the second possible implementation of the fifth aspect, the third possible implementation of the fifth aspect, the fourth possible implementation of the fifth aspect, the fifth possible implementation of the fifth aspect, the sixth possible implementation of the fifth aspect, or the seventh possible implementation of the fifth aspect, in an eighth possible implementation, if all the N cells are deactivated in any reporting period, the receiver receives uplink data transmitted by the UE on the PRB.

According to a sixth aspect, a user equipment is provided, where the user equipment UE uses M cells to transmit data, and the user equipment includes a receiver and a transmitter, where the receiver receives configuration signaling transmitted by the base station, where the configuration signaling includes a reporting period of channel state information CSI of N cells in the M cells;

the receiver further receives channel status request signaling transmitted by the base station, where the channel status request signaling is used to instruct the UE to report the CSI of the N cells in the M cells; and the transmitter transmits, to the base station according to the reporting period, CSI of a cell that is in the N cells and that is managed by the base station, where M is an integer greater than 1, N is an integer greater than or equal to 1, and N≤M.

With reference to the sixth aspect, in a first possible implementation, the configuration signaling further includes information indicating that the N cells in the M cells are configured as a group and a group identifier of the group; and the transmitted channel status request signaling specifically includes the group identifier.

With reference to the sixth aspect or the first possible implementation of the sixth aspect, in a second possible implementation, each of the M cells has one index identifier, the index identifier is specified in a logic sequence, the channel status request signaling specifically includes an index identifier of one of the M cells, and the N cells are N consecutive activated cells, starting from a cell indicated by the index identifier, indicated in the index identifier logic sequence.

With reference to the sixth aspect, the first possible implementation of the sixth aspect, or the second possible implementation of the sixth aspect, in a third possible implementation, the channel status request signaling further includes a physical resource block PRB and a modulation and coding scheme that are required to report the CSI of the N cells in the M cells; and that the transmitter performs the step of transmitting, to the base station according to the reporting period, CSI of a cell that is in the N cells and that is managed by the base station includes:

the transmitter transmits, to the base station on the PRB according to the reporting period by using the modulation and coding scheme, the CSI of the cell that is in the N cells and that is managed by the base station.

With reference to the sixth aspect, the first possible implementation of the sixth aspect, the second possible implementation of the sixth aspect, or the third possible implementation of the sixth aspect, in a fourth possible implementation, the channel status request signaling is channel status request signaling scrambled by using a semi-persistent scheduling-temporary identifier SPS-RNTI.

With reference to the sixth aspect, the first possible implementation of the sixth aspect, the second possible implementation of the sixth aspect, the third possible implementation of the sixth aspect, or the fourth possible implementation of the sixth aspect, in a fifth possible implementation, the receiver receives an instruction that is used to deactivate at least one of the N cells and that is transmitted by the base station; and that the transmitter performs the step of transmitting, to the base station according to the reporting period, CSI of a cell that is in the N cells and that is managed by the base station includes:

the transmitter transmits, to the base station according to the reporting period, the CSI of the cell that is in the N cells and that is managed by the base station, where a value of reported CSI of the at least one deactivated cell is a preset value, and the preset value is used to indicate that the at least one cell is deactivated.

With reference to the sixth aspect, the first possible implementation of the sixth aspect, the second possible implementation of the sixth aspect, the third possible implementation of the sixth aspect, the fourth possible implementation of the sixth aspect, or the fifth possible implementation of the sixth aspect, in a sixth possible implementation, the receiver receives the channel status request signaling retransmitted by the base station; and the transmitter transmits, to the base station according to the reporting period, CSI of a cell that is in the N cells other than the deactivated cell and that is managed by the base station.

With reference to the sixth aspect, the first possible implementation of the sixth aspect, the second possible implementation of the sixth aspect, the third possible implementation of the sixth aspect, the fourth possible implementation of the sixth aspect, the fifth possible implementation of the sixth aspect, or the sixth possible implementation of the sixth aspect, in a seventh possible implementation, if all the N cells are deactivated in any reporting period, the transmitter stops transmitting the CSI of the N cells to the base station;

the user equipment further includes: a processor, where from a next period of any reporting period, the processor starts to continuously count a quantity of times of skipping transmitting, to the base station in each reporting period, the CSI of the cell that is in the N cells and that is managed by the base station; and when a value of the counting reaches a first specified threshold, if the receiver receives the channel status request signaling transmitted by the base station, and the N cells are activated, the transmitter terminates transmission of the CSI of the cell that is in the N cells and that is managed by the base station to the base station.

With reference to the sixth aspect, the first possible implementation of the sixth aspect, the second possible implementation of the sixth aspect, the third possible implementation of the sixth aspect, the fourth possible implementation of the sixth aspect, the fifth possible implementation of the sixth aspect, the sixth possible implementation of the sixth aspect, or the seventh possible implementation of the sixth aspect, in an eighth possible implementation, the transmitter transmits uplink data to the base station on the PRB;

the processor continuously counts a quantity of times of transmitting uplink data to the base station; and when a value of the counting reaches a second specified threshold, the processor determines that the base station cancels the allocated PRB resource.

It can be learned that according to the method for reporting a channel status and the device provided in the embodiments of the present invention, the base station configures the reporting period of transmitting channel state information by the UE, and sends the channel status request signaling to the UE, to instruct the UE to report channel state information of a specified cell, and the UE transmits the channel state information of the specified cell to the base station, so that the base station can reliably obtain a channel status of the specified cell in a timely manner with low costs, and can efficiently arrange sending of downlink data. This saves a large quantity of channel transmission resources.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the embodiments of the present invention, UE uses multiple cells to transmit data, and the multiple cells are scheduled by a same base station. In this case, the base station needs to learn of channel quality information of the UE in these cells, so as to arrange, for the UE, a channel resource used for transmitting downlink data.

The base station may allocate a static or dynamic resource to the UE to transmit channel state information, or may allocate a semi-persistent resource to the UE to transmit channel state information. A reason that the semi-persistent resource may be allocated to the UE is as follows: A part of characteristics of such resource is configured by using radio resource control (RRC) signaling and does not easily change, such as a period; and the other part of the characteristics is configured by using physical layer signaling PDCCH and may rapidly change, such as a subcarrier location or a modulation and coding scheme (MCS). A resource periodically appears once the resource is configured. In the embodiments of the present invention, a semi-persistent scheduling mode is used, and a PUSCH resource is allocated to the UE to transmit CSI, so that the base station can reliably obtain, with low costs, a channel status that is of a cell and that is reported by the UE, and can efficiently arrange sending of downlink data.

Figure 1:
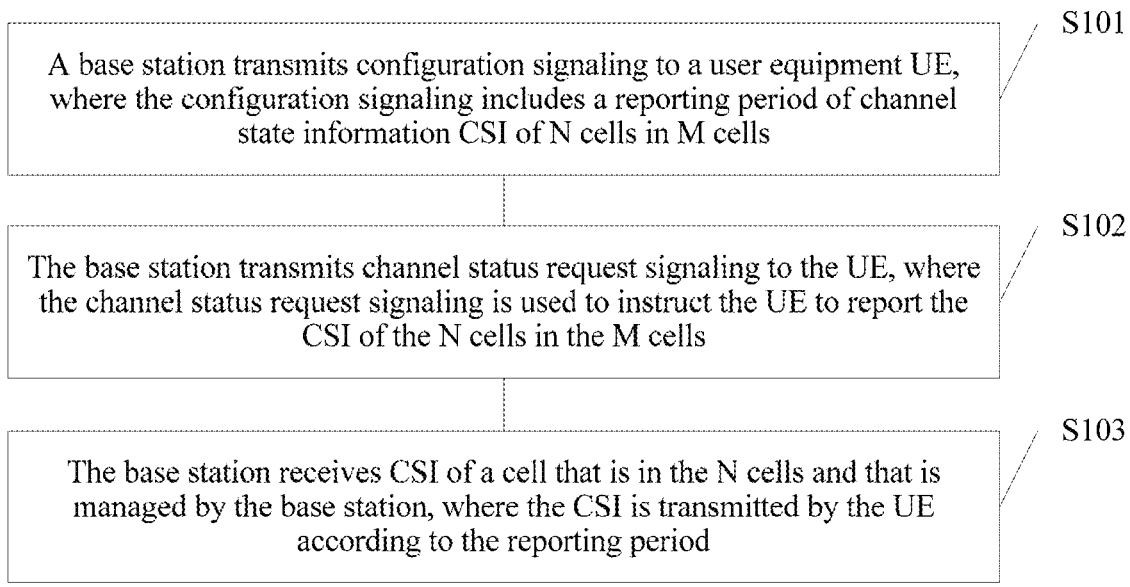
FIG. 1 is a schematic flowchart of a method for reporting a channel status according to an embodiment of the present invention.

Referring to FIG. 1, FIG. 1 is a schematic flowchart of a method for reporting a channel status according to an embodiment of the present invention. UE uses M cells to transmit data, and the method includes the following steps:

Step S101: A base station transmits configuration signaling to the user equipment UE, where the configuration signaling includes a reporting period of channel state information CSI of N cells in the M cells.

The base station transmits the configuration signaling to the UE. The configuration signaling may be semi-persistent scheduling (SPS) signaling, the configuration signaling may be sent to the UE by using RRC layer signaling, Medium Access Control (MAC) layer signaling, or other higher layer signaling, and the configuration signaling includes a period of reporting CSI of multiple cells by the UE.

It should be noted that, the M cells herein may be managed by a same base station or may be managed by multiple base stations. For example, the UE uses 32 cells, where 10 cells are managed by a base station A and the other 22 cells are managed by a base station B. Certainly, there may be more than two base stations. Configuration signaling of the N cells may be transmitted by one base station to the UE.

Step S102: The base station transmits channel status request signaling to the UE, where the channel status request signaling is used to instruct the UE to report the CSI of the N cells in the M cells; and M is an integer greater than 1, N is an integer greater than or equal to 1, and N≤M.

In this embodiment of the present invention, the UE does not need to report CSI of all cells used by the UE. When the base station considers that reporting of CSI of a specified cell used by the UE needs to be activated, the channel status request signaling may be sent to instruct the UE to report the CSI of the specified cell. The channel status request signaling may be downlink control information (DCI). The UE may report the CSI according to the reporting period by using a PUSCH channel.

In a case in which cells used by the UE are managed by multiple base stations, a part of the N specified cells herein may be managed by the base station A, and the other part of the cells may be managed by the base station B. The channel status request signaling may be sent by the base station A or the base station B, or may be sent by different base stations. The base station A may request CSI of a cell managed by the base station A, and the base station B may request CSI of a cell managed by the base station B.

Step S103: The base station receives CSI of a cell that is in the N cells and that is managed by the base station, where the CSI is transmitted by the UE according to the reporting period.

After receiving the channel status request signaling of the base station, the UE periodically reports the CSI of the specified cell to the base station according to the period in the configuration signaling, and the CSI may be sent by using the PUSCH. The base station receives the CSI of the specified cell. Certainly, the specified cell may be all cells used by the UE, or some cells used by the UE.

In a case in which cells used by the UE are managed by multiple base stations, the UE transmits CSI of a cell managed by the base station A to the base station A, and the UE transmits CSI of a cell managed by the base station B to the base station B.

Because CSI of all cells specified by the base station can be reported at a time, reporting efficiency is greatly improved. CSI is periodically reported, and therefore, the base station does not need to continuously allocate PUSCH resources to the UE, and does not need to continuously instruct the UE to transmit CSI together with data. This saves a large quantity of PDCCH resources and PUSCH resources. Therefore, according to the method for reporting a channel status provided in this embodiment of the present invention, the base station configures the reporting period of transmitting channel state information by the UE, and sends the channel status request signaling to the UE, to instruct the UE to report channel state information of a specified cell, and the UE transmits the channel state information of the specified cell to the base station, so that the base station can reliably obtain a channel status of a cell in a timely manner with low costs, and can efficiently arrange sending of downlink data.

In an implementation, the base station may preconfigure multiple cell groups, and each group may include one or more cells.

Therefore, the configuration signaling may further include information indicating that the N cells in the M cells are configured as a group. In this case, the channel status request signaling may include a group identifier of the group. When the base station considers that reporting of CSI of a cell group needs to be activated, the channel status request signaling may be used to instruct the UE to report CSI of a cell in the cell group. In this case, the channel status request signaling may include a group identifier indicating a cell group to be activated, and the cell group to be activated may be explicitly or implicitly indicated in the channel status request signaling. For example, a radio network temporary identifier (RNTI) is used to indicate a cell group, or the UE may deduce, according to a cell for which the channel status request signaling is received and a cell group to which the cell belongs, a cell group whose channel status is instructed by the base station to be reported.

In addition, the channel status request signaling may further include a physical resource block (PRB) and an MCS, where CSI is reported by using the PRB resource, and CSI is reported by the UE on a PUSCH channel by using the MCS. In a case in which cells used by the UE are managed by multiple base stations, it is assumed that the N cells herein are separately managed by the base station A and the base station B. If the base station A sends channel status request signaling, the channel status request signaling includes PRB resources separately used by the base station A and the base station B for reporting CSI and MCSs separately used by the base station A and the base station B.

Therefore, step S103 may be: the base station receives the CSI of the cell that is in the N cells and that is managed by the base station, where the CSI is transmitted by the UE on the PRB according to the reporting period by using the modulation and coding scheme.

Optionally, in an LTE system, at an interval of 4 ms after the channel status request signaling is received, that is, in the fourth subframe, the UE starts to transmit CSI of a cell in a specified cell group on a specified PRB, and periodically reports CSI in each reporting period. The following uses an example for illustration. The UE configures 32 cells: cell 0 to cell 31, and a current activation status of each cell is shown as follows:

TABLE 1

Cells of the UE and activation statuses of the cells

| Cell index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Activation status | ✓ | x | ✓ | ✓ | x | ✓ | ✓ | ✓ | ✓ | ✓ | ✓ | x | x | ✓ | ✓ | x |
| Cell index | 16 | 17 | 18 | 19 | 20 | 21 | 22 | 23 | 24 | 25 | 26 | 27 | 28 | 29 | 30 | 31 |
| Activation status | x | ✓ | x | ✓ | x | ✓ | ✓ | ✓ | x | x | x | ✓ | ✓ | ✓ | ✓ | x |

In the foregoing table, √ indicates that a corresponding cell is in an active state, and x indicates that a corresponding cell is in an inactive state. It can be learned that there are 20 activated cells, and 12 deactivated cells.

A cell group configured by the base station is shown as follows:

TABLE 2

Cell group configured by the base station

| Cell group | Included cells |
|---|---|
| 1 | 0, 2, 3, 5, 6 |
| 2 | 7, 8, 9, 10, 13 |
| 3 | 14, 17, 19, 21, 22 |
| 4 | 23, 27, 28, 29, 30 |

Optionally, when the base station sends the channel status request signaling to the UE, the channel status request signaling may be scrambled by using a dedicated channel state information-temporary identifier (CSI-RNTI), and the channel status request signaling includes the following information:

information used for instructing to periodically send CSI of a cell group 2;
an MCS, that is, an MCS used for sending the CSI; and
a PRB resource used for sending the CSI.

After receiving the channel status request signaling, the UE starts to report CSI of five cells 7, 8, 9, 10, and 13 in a specified subframe (generally, the fourth subframe) on a specified PRB by using a specified MCS, and periodically performs the reporting operation.

According to the method for reporting a channel status in this implementation, a PUSCH channel resource can be used to periodically report CSI of multiple cells used by the UE, and implementation of this method is simple and reliable.

Figure 2:
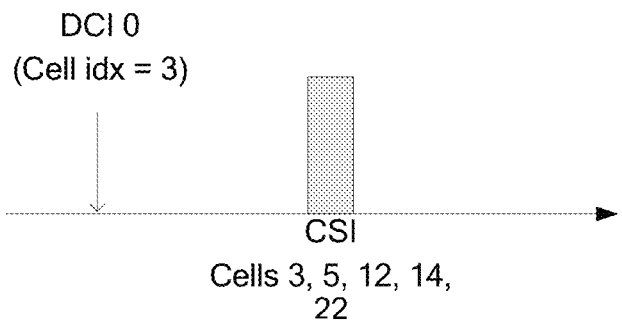
FIG. 2 is a schematic diagram of reporting channel state information by UE according to an embodiment of the present invention.

In another implementation, the base station does not need to preconfigure a cell group. The base station only needs to notify the UE of the reporting period and a channel quality indicator-temporary identifier (CQI-RNTI) (optional) in advance by transmitting the configuration signaling. Optionally, each of the M cells has one index identifier, and the index identifier is specified in a logic sequence. When the UE is instructed to perform CSI reporting, the base station may send the channel status request signaling to the UE by using a PDCCH, and add an index identifier of a cell (Cell Idx) to the channel status request signaling. After receiving the channel status request signaling, the UE starts to report the CSI of the N cells, where the N cells are N activated cells, following a cell indicated by the specified cell Idx, indicated in the logic sequence. For example, FIG. 2 is a schematic diagram of reporting channel state information by UE. It is assumed that the UE has 14 activated cells 0, 1, 3, 5, 12, 14, 22, 23, 24, 27, 28, 29, 30, and 31, and the base station notifies, by using a DCI format 0, that is, a DCI 0, the UE that cell Idx=3. In this case, the UE starts to periodically send CSI of five cells 3, 5, 12, 14, and 22, and N is equal to 5 herein. In addition, the base station may add an index of the last cell to the channel status request signaling. After receiving the channel status request signaling, the UE starts to determine a specified quantity of activated cells preceding a cell indicated by the specified cell Idx, and reports CSI of the specified quantity of the cells. That is, the specified cells herein are N consecutive activated cells, starting from a cell indicated by the index identifier, indicated in the index identifier logic sequence.

In still another implementation, the base station may indicate a cell list in the channel status request signaling, and the UE sends CSI of a cell in the list.

In still another implementation, the base station may add a bitmap to the channel status request signaling, and the bitmap is used to indicate cells whose CSI is to be sent by the UE. For example, 32 cells may be corresponding to 32 bits. If a bit value corresponding to a cell is 0, it indicates that the UE does not need to send CSI of the cell. If a bit value corresponding to a cell is 1, it indicates that the UE needs to send CSI of the cell.

According to the solution in this implementation, without a need to configure a cell group, the base station can rapidly specify a UE feedback, and can request, at any time according to a requirement, the UE to feed back a cell status report required by the base station.

Optionally, the channel status request signaling sent by the base station to the UE is channel status request signaling scrambled by using a semi-persistent scheduling-temporary identifier (SPS-RNTI). An allocation message carries an SPS-RNTI identifier. The UE obtains an uplink resource corresponding to an SPS-RNTI identifier of the UE, and deduces, according to a combination of an MCS and a quantity of PRBs allocated by the base station, that the resource is used to transmit CSI.

Optionally, when the base station considers that reporting of CSI of a cell group needs to be activated, the base station allocates the uplink resource by using the SPS-RNTI identifier of the UE. In addition, the channel status request signaling is indicated in the channel status request signaling to enable the UE to periodically transmit CSI, instead of reporting an SPS. An implicit indication or an explicit indication may be performed by using the combination of an MCS and a quantity of PRBs allocated by the base station. For example, if a particular PRB is combined with a particular MCS, it indicates that the base station requests the UE to send only CSI, instead of uplink data or uplink data and CSI.

After receiving the channel status request signaling scrambled by using the SPS-RNTI, the UE determines, according to the explicit indication or the combination of a modulation and coding scheme and a quantity of included PRBs, that CSI reporting is activated, learns of a cell or cells whose CSI needs to be obtained by the base station, and periodically reports the CSI in a subsequent subframe.

According to the technical solution in this implementation, an original SPS-RNTI may be reused to activate the UE to periodically report CSI of a cell group. In this way, the UE can be activated to periodically report CSI of a cell group, without a need to allocate a dedicated CSI-RNTI to the UE.

Figure 3:
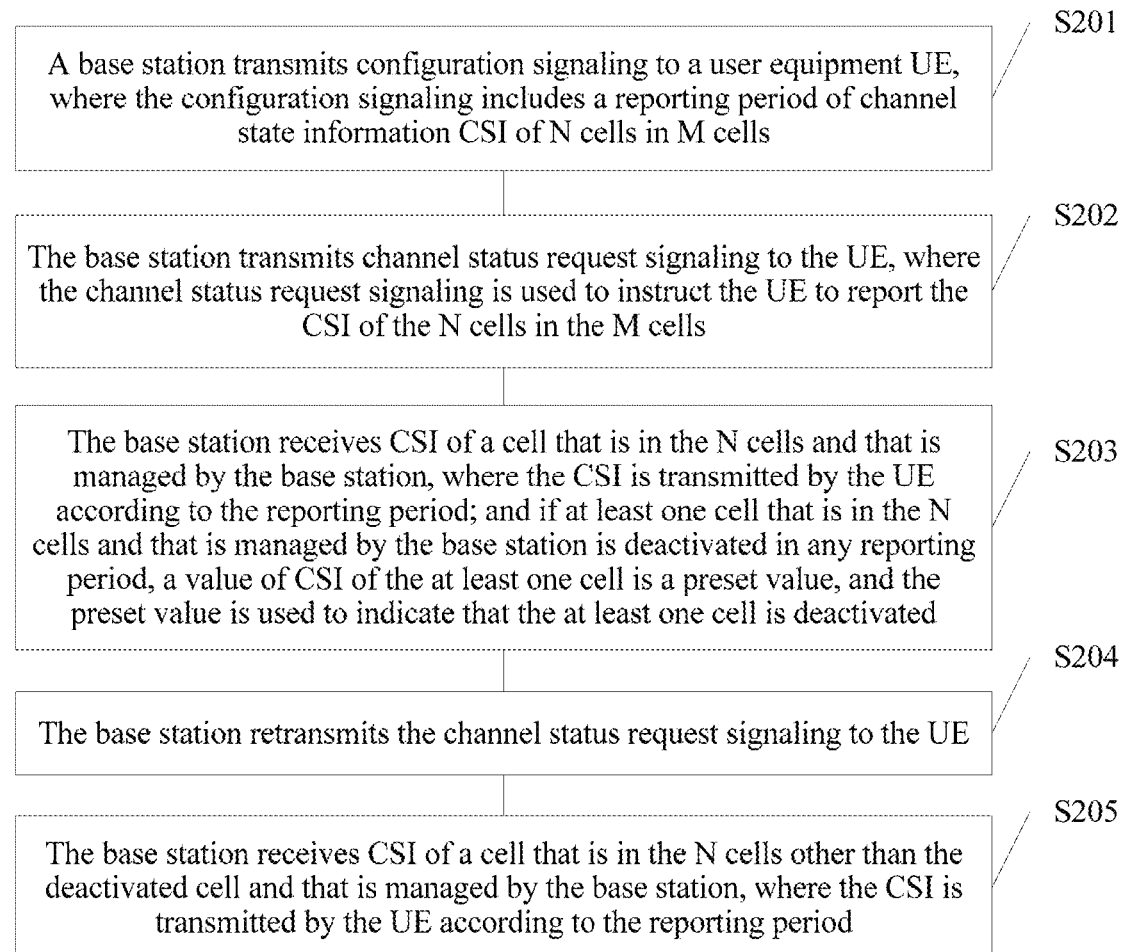
FIG. 3 is a schematic flowchart of another method for reporting a channel status according to an embodiment of the present invention.

Referring to FIG. 3, FIG. 3 is a schematic flowchart of another method for reporting a channel status according to an embodiment of the present invention. Different from the foregoing embodiment, control of reporting of CSI of a deactivated cell is added on the basis of the foregoing embodiment. In this embodiment, at least one cell that is in the N cells and that is managed by the base station is deactivated in any reporting period. In step S203, the CSI of the N cells is still reported. However, a value of reported CSI of the deactivated cell is a preset value, and the preset value is used to indicate that the at least one cell is deactivated. This embodiment of the present invention may include all the content of steps S101 to S103 in the embodiment in FIG. 1.

In addition, the method further includes the following steps:

Step S204: The base station retransmits the channel status request signaling to the UE.

Step S205: The base station receives CSI of a cell that is in the N cells other than the deactivated cell and that is managed by the base station, where the CSI is transmitted by the UE according to the reporting period.

Specifically, when the base station instructs the UE to periodically report CSI of a cell group, the UE determines an activated cell in the cell group, and reports the activated cell in the cell group. If a cell is deactivated in the reporting period, the UE sets a value of CSI of the deactivated cell to the preset value for reporting.

Optionally, the preset value is out of range (OOR).

Figure 4:
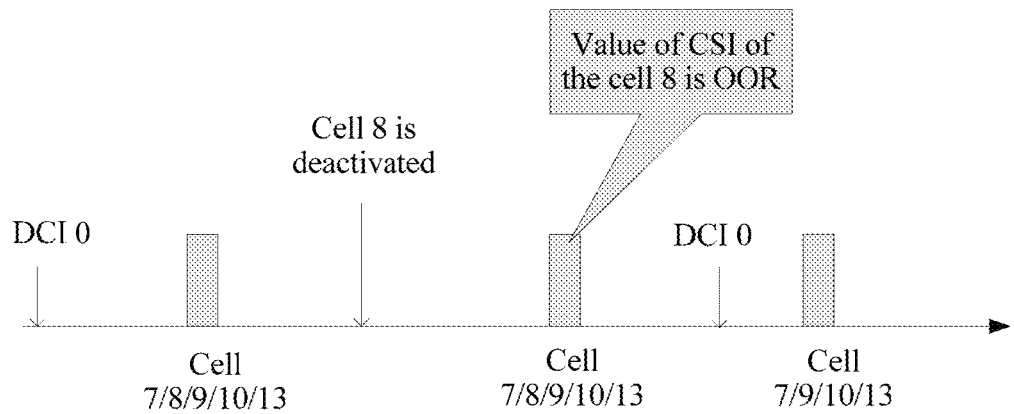
FIG. 4 is another schematic diagram of reporting channel state information by UE according to an embodiment of the present invention.

As shown in FIG. 4, the base station requests, by using a DCI 0, the UE to report CSI of cells 7, 8, 9, 10, and 13, and the UE starts to periodically report the CSI corresponding to the cells 7, 8, 9, 10, and 13. For example, if the cell 8 is deactivated at a time point after the UE is activated, the UE sets a value of CSI of the cell 8 to the OOR when performing reporting in each subsequent period. Optionally, if the DCI 0 that is used to request to report the CSI of the cells 7, 8, 9, 10, and 13 and that is sent by the base station is received by the UE again, the UE reports only CSI of the cells 7, 9, 10, and 13 without the CSI of the cell 8.

According to the solution in this implementation, control of reporting of CSI of a deactivated cell is added, so that the base station can flexibly control a reporting action of the UE.

Figure 5:
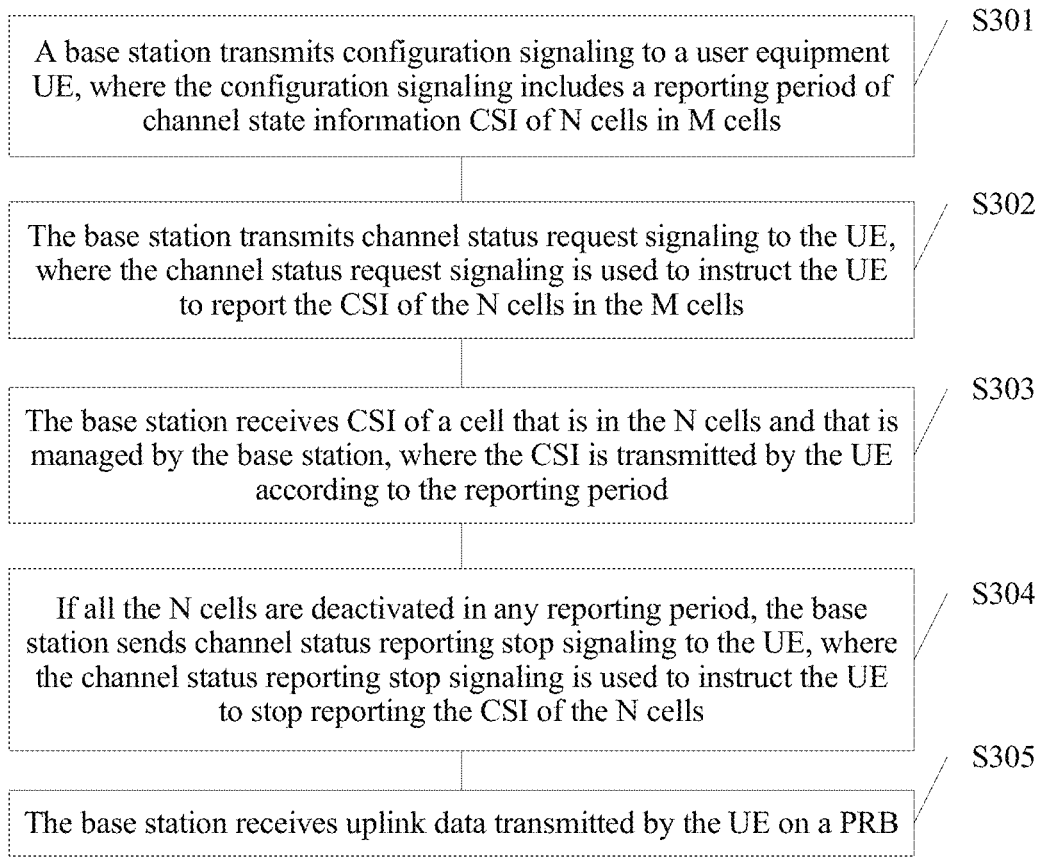
FIG. 5 is a schematic flowchart of still another method for reporting a channel status according to an embodiment of the present invention.

Referring to FIG. 5, FIG. 5 is a schematic flowchart of still another implementation of a method for reporting a channel status according to an embodiment of the present invention. Different from the foregoing embodiment, in this implementation, control of reporting of CSI of a deactivated cell is added on the basis of the foregoing embodiment, and the deactivated cell herein means that all cells in a cell group are deactivated. Therefore, in addition to all the content of steps S101 to S103 in the embodiment in FIG. 1, the method includes the following step:

Step S304: If all the N cells are deactivated in any reporting period, the base station sends channel status reporting stop signaling to the UE, where the channel status reporting stop signaling is used to instruct the UE to stop reporting the CSI of the N cells.

Figure 6:
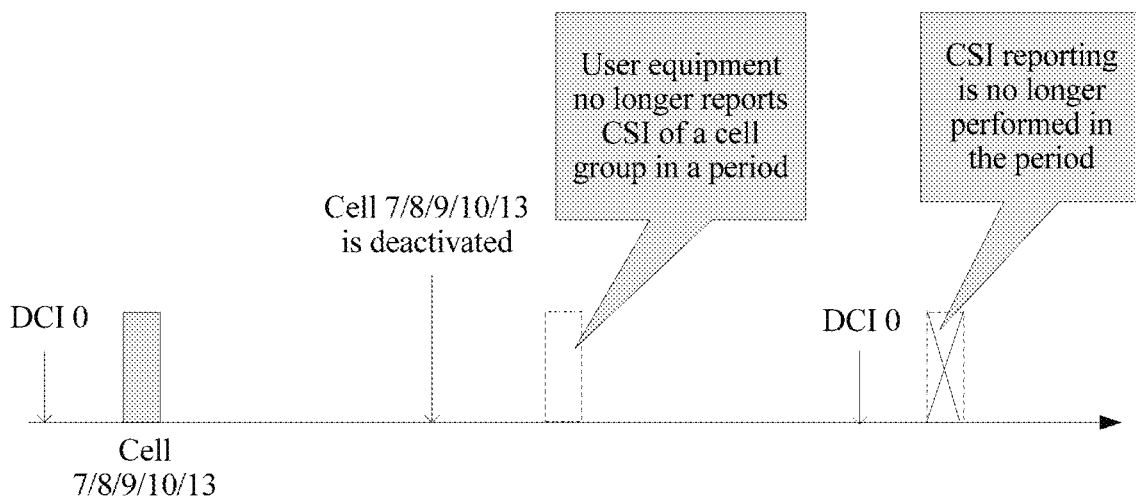
FIG. 6 is still another schematic diagram of reporting channel state information by UE according to an embodiment of the present invention.

Optionally, the channel status reporting stop signaling sent by the base station to the UE may be a PDCCH instruction. As shown in FIG. 6, an axis direction is a forward time direction. After a first DCI 0 on the left is triggered, all the N cells 7, 8, 9, 10, and 13 are deactivated, and the UE no longer reports the CSI of these cells. When another DCI sent by the base station is received by the UE, that is, when a second DCI 0 on the left in FIG. 6 is triggered, the UE no longer reports the CSI in this period. In this way, a reporting action of the UE can be optimized, and resources can be reclaimed in a timely manner.

Optionally, this embodiment of the present invention may further include step S305.

Step S305: The base station receives uplink data transmitted by the UE on the PRB.

Figure 7:
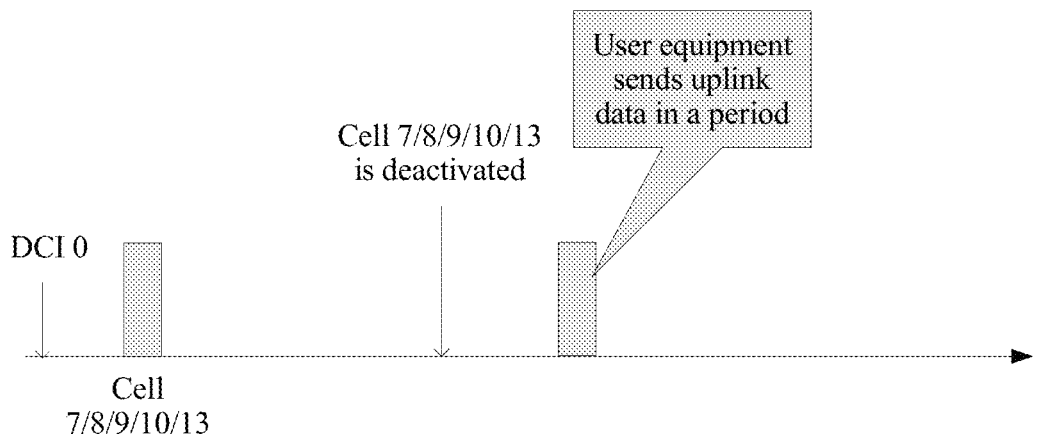
FIG. 7 is still another schematic diagram of reporting channel state information by UE according to an embodiment of the present invention.

In this implementation, PUSCH resource reuse is further added. As shown in FIG. 7, if channel status request signaling is used to request to deactivate the cells 7, 8, 9, 10, and 13 whose CSI is to be reported, the UE no longer reports the CSI of these cells. However, because the PUSCH resource is idle, the UE may send the uplink data by using the resource. In this way, the UE can make full use of an uplink resource.

Figure 8:
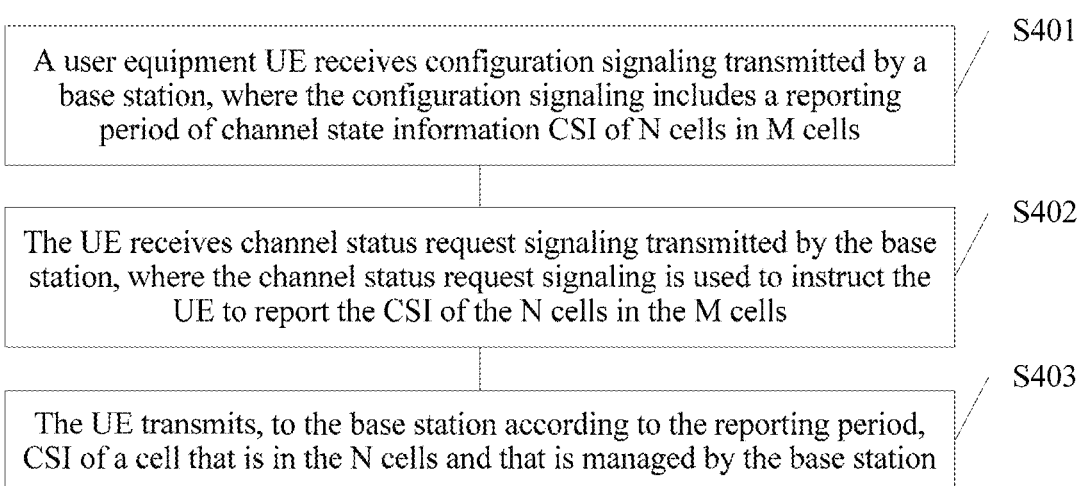
FIG. 8 is a schematic flowchart of still another method for reporting a channel status according to an embodiment of the present invention.

Referring to FIG. 8, FIG. 8 is a schematic flowchart of still another method for reporting a channel status according to an embodiment of the present invention. A user equipment UE uses M cells to transmit data, and the method includes the following steps.

Step S401: The user equipment UE receives configuration signaling transmitted by the base station, where the configuration signaling includes a reporting period of channel state information CSI of N cells in the M cells.

The base station transmits the configuration signaling to the UE. The configuration signaling may be semi-persistent scheduling signaling, the configuration signaling may be sent to the UE by using RRC layer signaling, Medium Access Control layer signaling, or other higher layer signaling, and the configuration signaling includes a period of reporting CSI of multiple cells by the UE.

The UE receives the configuration signaling transmitted by the base station.

It should be noted that, the M cells herein may be managed by a same base station or may be managed by multiple base stations. For example, the UE uses 32 cells, where 10 cells are managed by a base station A and the other 22 cells are managed by a base station B. Certainly, there may be more than two base stations. Configuration signaling of the N cells may be transmitted by one base station to the UE.

Step S402: The UE receives channel status request signaling transmitted by the base station, where the channel status request signaling is used to instruct the UE to report the CSI of the N cells in the M cells; and M is an integer greater than 1, N is an integer greater than or equal to 1, and N≤M.

In this embodiment of the present invention, the UE does not need to report CSI of all cells used by the UE. When the base station considers that reporting of CSI of a specified cell used by the UE needs to be activated, the channel status request signaling may be sent to instruct the UE to report the CSI of the specified cell. The channel status request signaling may be downlink control information (DCI). The UE may report the CSI according to the reporting period by using a PUSCH channel. The UE receives the channel status request signaling transmitted by the base station, and parses the signaling to indicate specified cells whose CSI is to be reported by the UE.

In a case in which cells used by the UE are managed by multiple base stations, a part of the N specified cells herein may be managed by the base station A, and the other part of the cells may be managed by the base station B. The channel status request signaling may be sent by the base station A or the base station B, or may be sent by different base stations. The base station A may request CSI of a cell managed by the base station A, and the base station B may request CSI of a cell managed by the base station B.

Step S403: The UE transmits, to the base station according to the reporting period, CSI of a cell that is in the N cells and that is managed by the base station.

After receiving the channel status request signaling of the base station, the UE periodically reports the CSI of the specified cell to the base station according to the period in the configuration signaling, and the CSI may be sent by using the PUSCH. The base station receives the CSI of the specified cell. Certainly, the specified cell may be all cells used by the UE, or some cells used by the UE.

In a case in which cells used by the UE are managed by multiple base stations, the UE transmits CSI of a cell managed by the base station A to the base station A, and the UE transmits CSI of a cell managed by the base station B to the base station B.

Because CSI of all cells specified by the base station can be reported at a time, reporting efficiency is greatly improved. CSI is periodically reported, and therefore, the base station does not need to continuously allocate PUSCH resources to the UE, and does not need to continuously instruct the UE to transmit CSI together with data. This saves a large quantity of PDCCH resources and PUSCH resources.

Therefore, according to the method for reporting a channel status provided in this embodiment of the present invention, the base station configures the reporting period of transmitting channel state information by the UE, and sends the channel status request signaling to the UE, to instruct the UE to report channel state information of a specified cell, and the UE transmits the channel state information of the specified cell to the base station, so that the base station can reliably obtain a channel status of a cell in a timely manner with low costs, and can efficiently arrange sending of downlink data.

In an implementation, the base station may preconfigure multiple cell groups, and each group may include one or more cells.

Therefore, the configuration signaling may further include information indicating that the N cells in the M cells are configured as a group. In this case, the channel status request signaling may include a group identifier of the group. When the base station considers that reporting of CSI of a cell group needs to be activated, the channel status request signaling may be used to instruct the UE to report CSI of a cell in the cell group. In this case, the channel status request signaling may include a group identifier indicating a cell group to be activated, and the cell group to be activated may be explicitly or implicitly indicated in the channel status request signaling. For example, a radio network temporary identifier is used to indicate a cell group, or the UE may deduce, according to a cell for which the channel status request signaling is received and a cell group to which the cell belongs, a cell group whose channel status is instructed by the base station to be reported.

In addition, the channel status request signaling may further include a physical resource block (PRB) and an MCS, where CSI is reported by using the PRB resource, and CSI is reported by the UE on a PUSCH channel by using the MCS. In a case in which cells used by the UE are managed by multiple base stations, it is assumed that the N cells herein are separately managed by the base station A and the base station B. If the base station A sends channel status request signaling, the channel status request signaling includes PRB resources separately used by the base station A and the base station B for reporting CSI and MCSs separately used by the base station A and the base station B.

Therefore, step S403 may be: the UE transmits, to the base station on the PRB according to the reporting period by using the modulation and coding scheme, the CSI of the cell that is in the N cells and that is managed by the base station.

Optionally, in an LTE system, at an interval of 4 ms after the channel status request signaling is received, that is, in the fourth subframe, the UE starts to transmit CSI of a cell in a specified cell group on a specified PRB, and periodically reports CSI in each reporting period.

According to the method for reporting a channel status in this implementation, a PUSCH channel resource can be used to periodically report CSI of multiple cells used by the UE, and implementation of this method is simple and reliable.

In another implementation, the base station does not need to preconfigure a cell group. The base station only needs to notify the UE of the reporting period and a channel quality indicator-temporary identifier CQI-RNTI (optional) in advance by transmitting the configuration signaling. Optionally, each of the M cells has one index identifier, and the index identifier is specified in a logic sequence. When the UE is instructed to perform CSI reporting, the base station may send the channel status request signaling to the UE by using a PDCCH, and add an index identifier of a cell, that is, cell Idx to the channel status request signaling. After receiving the channel status request signaling, the UE starts to report the CSI of the N cells, where the N cells are N activated cells, following a cell indicated by the specified cell Idx, indicated in the logic sequence. For example, FIG. 2 is a schematic diagram of reporting channel state information by UE. The UE has 14 activated cells 0, 1, 3, 5, 12, 14, 22, 23, 24, 27, 28, 29, 30, and 31, and the base station notifies, by using a DCI 0, the UE that cell Idx=3. In this case, the UE starts to periodically send CSI of five cells 3, 5, 12, 14, and 22, and N is equal to 5 herein. In addition, the base station may add an index of the last cell to the channel status request signaling. After receiving the channel status request signaling, the UE starts to determine a specified quantity of activated cells preceding a cell indicated by the specified cell Idx, and reports CSI of the specified quantity of the cells. That is, the specified cells herein are N consecutive activated cells, starting from a cell indicated by the index identifier, indicated in the index identifier logic sequence.

In still another implementation, the base station may indicate a cell list in the channel status request signaling, and the UE sends CSI of a cell in the list.

In still another implementation, the base station may add a bitmap to the channel status request signaling, and the bitmap is used to indicate cells whose CSI is to be sent by the UE. For example, 32 cells may be corresponding to 32 bits. If a bit value corresponding to a cell is 0, it indicates that the UE does not need to send CSI of the cell. If a bit value corresponding to a cell is 1, it indicates that the UE needs to send CSI of the cell.

According to the solution in this implementation, without a need to configure a cell group, the base station can rapidly specify a UE feedback, and can request, at any time according to a requirement, the UE to feed back a cell status report required by the base station.

Optionally, the channel status request signaling sent by the base station to the UE is channel status request signaling scrambled by using a semi-persistent scheduling-temporary identifier (SPS-RNTI). An allocation message carries an SPS-RNTI identifier. The UE obtains an uplink resource corresponding to an SPS-RNTI identifier of the UE, and deduces, according to a combination of an MCS and a quantity of PRBs allocated by the base station, that the resource is used to transmit CSI. Alternatively, there may be an explicit indication.

When the base station considers that reporting of CSI of a cell group needs to be activated, the base station allocates the uplink resource by using the SPS-RNTI identifier of the UE. In addition, the channel status request signaling is indicated in the channel status request signaling to enable the UE to periodically transmit CSI, instead of reporting an SPS. An implicit indication or an explicit indication may be performed by using the combination of an MCS and a quantity of PRBs allocated by the base station. For example, if a particular PRB is combined with a particular MCS, it indicates that the base station requests the UE to send only CSI, instead of uplink data or uplink data and CSI.

After receiving the channel status request signaling scrambled by using the SPS-RNTI, the UE determines, according to the combination of a modulation and coding scheme and a quantity of included PRBs, that CSI reporting is activated, learns of a cell or cells whose CSI needs to be obtained by the base station, and periodically reports the CSI in a subsequent subframe.

According to the technical solution in this implementation, an original SPS-RNTI may be reused to activate the UE to periodically report CSI of a cell group. In this way, the UE can be activated to periodically report CSI of a cell group, without a need to allocate a dedicated CSI-RNTI to the UE.

Figure 9:
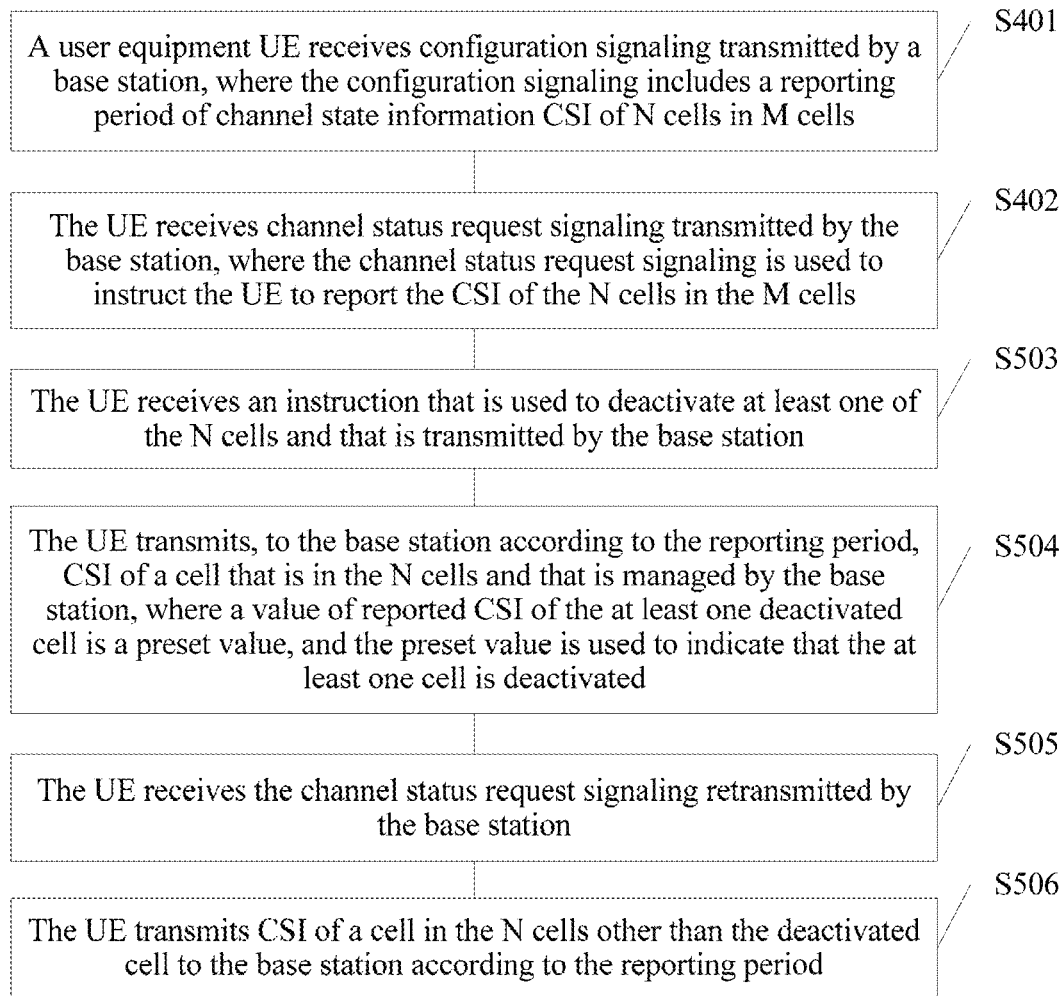
FIG. 9 is a schematic flowchart of still another method for reporting a channel status according to an embodiment of the present invention.

Referring to FIG. 9, FIG. 9 is a schematic flowchart of still another method for reporting a channel status according to an embodiment of the present invention. Different from the foregoing embodiment, control of reporting of CSI of a deactivated cell is added on the basis of the foregoing embodiment. In this embodiment, at least one of the N cells is deactivated in any reporting period. In step S504, the CSI of the N cells is still reported. However, a value of reported CSI of the deactivated cell is a preset value, and the preset value is used to indicate that the at least one cell is deactivated. This embodiment of the present invention may include all the content of steps S401 and S402 in the embodiment in FIG. 8.

In addition, the method further includes the following steps:

Step S503: The UE receives an instruction that is used to deactivate at least one of the N cells and that is transmitted by the base station.

Step S504 is specifically described as follows:

Step S504: The UE transmits, to the base station according to the reporting period, the CSI of the cell that is in the N cells and that is managed by the base station, where a value of reported CSI of the at least one deactivated cell is a preset value, and the preset value is used to indicate that the at least one cell is deactivated.

Specifically, when the base station instructs the UE to periodically report CSI of a cell group, the UE determines an activated cell in the cell group, and reports the activated cell in the cell group. If a cell is deactivated in the reporting period, the UE sets a value of CSI of the deactivated cell to the preset value for reporting.

Optionally, the preset value is out of range (OOR).

As shown in FIG. 4, the base station requests, by using a DCI, the UE to report CSI of cells 7, 8, 9, 10, and 13, and the UE starts to periodically report the CSI corresponding to the cells 7, 8, 9, 10, and 13. For example, if the cell 8 is deactivated at a time point after the UE is activated to periodically report the CSI, the UE sets a value of CSI of the cell 8 to the OOR when performing reporting in each subsequent period. Optionally, if the DCI that is used to request to report the CSI of the cells 7, 8, 9, 10, and 13 and that is sent by the base station is received by the UE again, the UE reports only CSI of the cells 7, 9, 10, and 13 without the CSI of the cell 8.

That is, the method may further include the following steps:

Step S505: The UE receives the channel status request signaling retransmitted by the base station.

Step S506: The UE transmits CSI of a cell in the N cells other than the deactivated cell to the base station according to the reporting period.

According to the solution in this implementation, control of reporting of CSI of a deactivated cell is added, so that the base station can flexibly control a reporting action of the UE.

Figure 10:
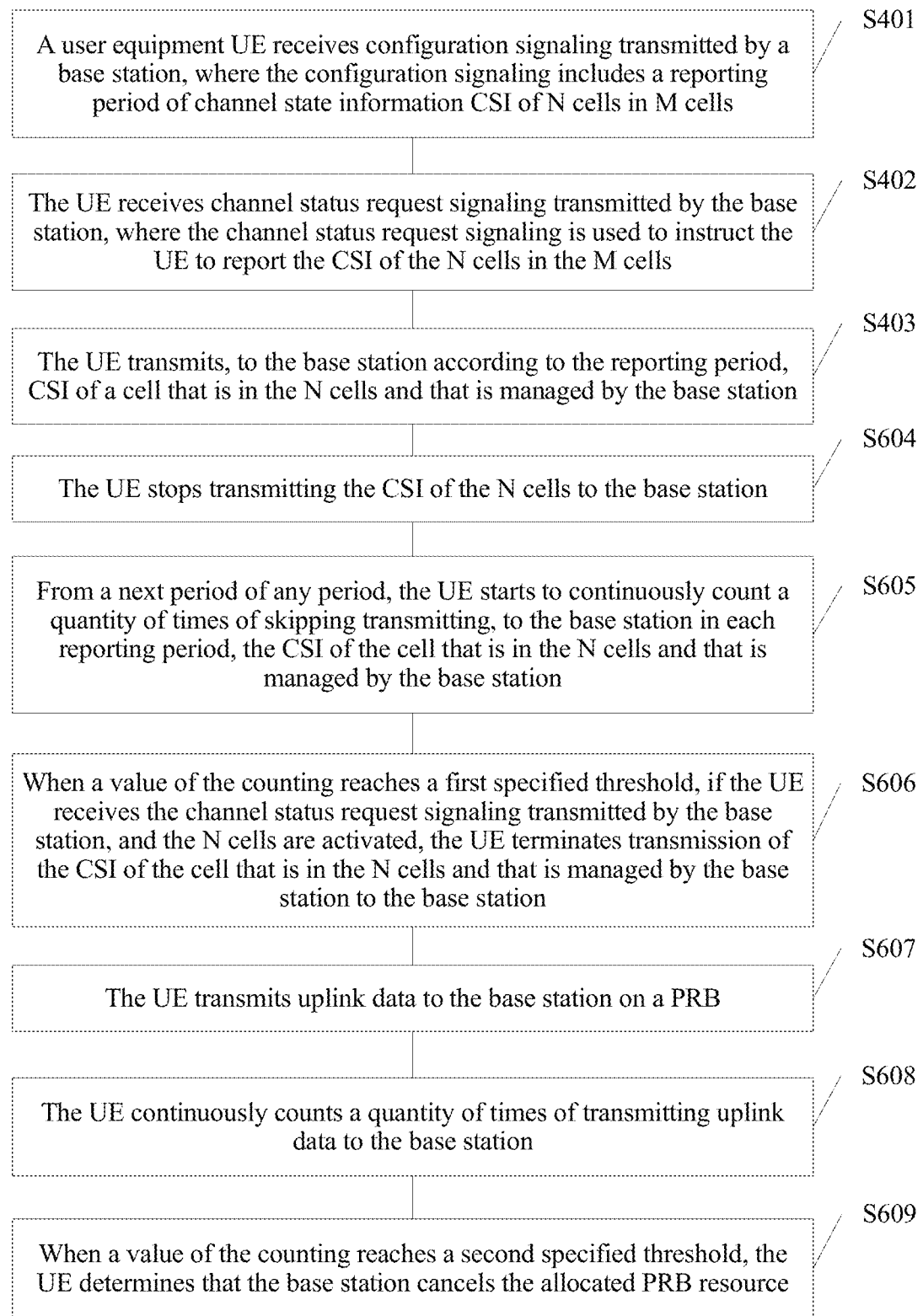
FIG. 10 is a schematic flowchart of still another implementation of a method for reporting a channel status according to an embodiment of the present invention.

Referring to FIG. 10, FIG. 10 is a schematic flowchart of still another implementation of a method for reporting a channel status according to an embodiment of the present invention. Different from the foregoing embodiment, in this implementation, control of reporting of CSI of a deactivated cell is added on the basis of the foregoing embodiment, and the deactivated cell herein means that all cells in a cell group are deactivated. Therefore, in addition to all the content of steps S401 to S403 in the embodiment in FIG. 8, the method includes the following steps:

Step S604: The UE stops transmitting the CSI of the N cells to the base station.

Step S605: From a next period of any reporting period, the UE starts to continuously count a quantity of times of skipping transmitting, to the base station in each reporting period, the CSI of the cell that is in the N cells and that is managed by the base station.

Step S606: When a value of the counting reaches a first specified threshold, if the UE receives the channel status request signaling transmitted by the base station, and the N cells are activated, the UE terminates transmission of the CSI of the cell that is in the N cells and that is managed by the base station to the base station.

If all the cells in the cell group are deactivated in any reporting period, the UE no longer sends CSI on a predetermined radio resource. In a next period, the UE starts to count a quantity of times of re-skipping sending CSI on the predetermined radio resource in each subsequent reporting period. If a quantity of occurrences of this case exceeds a threshold, the UE considers that the base station reclaims an uplink resource, and the UE skips sending CSI to the base station. After the sending is skipped, even if the base station device activates a cell in the cell group again, the UE no longer sends periodic CSI. In this way, a reporting action of the UE can be optimized, and resource deadlock can be prevented.

In the foregoing steps S604 to S606, an implicit deactivation implementation is described. Certainly, there may be explicit deactivation, that is, the base station sends channel status reporting stop signaling to the UE, and the channel status reporting stop signaling is used to instruct the UE to stop reporting the CSI of the N cells. When receiving the channel status reporting stop signaling, the UE stops the reporting.

Optionally, this embodiment of the present invention may further include steps S607 to S609.

Step S607: The UE transmits uplink data to the base station on the PRB.

Step S608: The UE continuously counts a quantity of times of transmitting uplink data to the base station.

Step S609: When a value of the counting reaches a second specified threshold, the UE determines that the base station cancels the allocated PRB resource.

In this implementation, PUSCH resource reuse is further added. As shown in FIG. 7, in any reporting period, if channel status request signaling is used to request to deactivate the N cells whose CSI is to be reported, the UE no longer reports the CSI. However, because the PUSCH resource is idle, the UE sends the uplink data by using the resource. From a next period, the UE starts to count a quantity of times of resending uplink data on the uplink resource in each subsequent reporting period. When the value of the counting reaches the second specified threshold, the UE may determine that the base station cancels the allocated uplink resource. In this way, the UE can make full use of an uplink resource.

Figure 11:
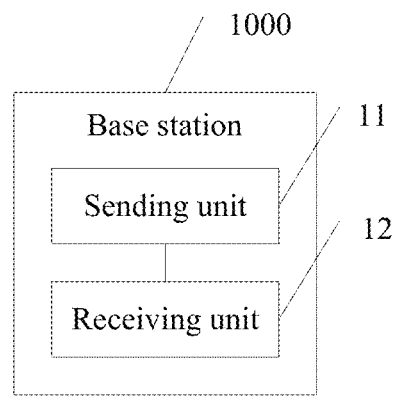
FIG. 11 is a schematic structural diagram of a base station according to an embodiment of the present invention.

Referring to FIG. 11, FIG. 11 is a schematic structural diagram of a base station according to an embodiment of the present invention. UE uses M cells to transmit data, and the base station 1000 includes a sending unit 11 and a receiving unit 12.

The sending unit 11 is configured to transmit configuration signaling to the user equipment UE, where the configuration signaling includes a reporting period of channel state information CSI of N cells in the M cells.

The base station transmits the configuration signaling to the UE. The configuration signaling may be semi-persistent scheduling (SPS) signaling, the configuration signaling may be sent to the UE by using RRC layer signaling, Medium Access Control (MAC) layer signaling, or other higher layer signaling, and the configuration signaling includes a period of reporting CSI of multiple cells by the UE.

It should be noted that, the M cells herein may be managed by a same base station or may be managed by multiple base stations. For example, the UE uses 32 cells, where 10 cells are managed by a base station A and the other 22 cells are managed by a base station B. Certainly, there may be more than two base stations. Configuration signaling of the N cells may be transmitted by one base station to the UE.

The sending unit 11 is further configured to transmit channel status request signaling to the UE, where the channel status request signaling is used to instruct the UE to report the CSI of the N cells in the M cells; and M is an integer greater than 1, N is an integer greater than or equal to 1, and N≤M.

In this embodiment of the present invention, the UE does not need to report CSI of all cells used by the UE. When the base station considers that reporting of CSI of a specified cell used by the UE needs to be activated, the channel status request signaling may be sent to instruct the UE to report the CSI of the specified cell. The channel status request signaling may be downlink control information (DCI). The UE may report the CSI according to the reporting period by using a PUSCH channel.

In a case in which cells used by the UE are managed by multiple base stations, a part of the N specified cells herein may be managed by the base station A, and the other part of the cells may be managed by the base station B. The channel status request signaling may be sent by the base station A or the base station B, or may be sent by different base stations. The base station A may request CSI of a cell managed by the base station A, and the base station B may request CSI of a cell managed by the base station B.

The receiving unit 12 is configured to receive CSI of a cell that is in the N cells and that is managed by the base station, where the CSI is transmitted by the UE according to the reporting period.

After receiving the channel status request signaling of the base station, the UE periodically reports the CSI of the specified cell to the base station according to the period in the configuration signaling, and the CSI may be sent by using the PUSCH. The base station receives the CSI of the specified cell. Certainly, the specified cell may be all cells used by the UE, or some cells used by the UE.

In a case in which cells used by the UE are managed by multiple base stations, the UE transmits CSI of a cell managed by the base station A to the base station A, and the UE transmits CSI of a cell managed by the base station B to the base station B.

Because CSI of all cells specified by the base station can be reported at a time, reporting efficiency is greatly improved. CSI is periodically reported, and therefore, the base station does not need to continuously allocate PUSCH resources to the UE, and does not need to continuously instruct the UE to transmit CSI together with data. This saves a large quantity of PDCCH resources and PUSCH resources.

Therefore, according to the base station provided in this embodiment of the present invention, the base station configures the reporting period of transmitting channel state information by the UE, and sends the channel status request signaling to the UE, to instruct the UE to report channel state information of a specified cell, and the UE transmits the channel state information of the specified cell to the base station, so that the base station can reliably obtain a channel status of a cell in a timely manner with low costs, and can efficiently arrange sending of downlink data.

In an implementation, the base station may preconfigure multiple cell groups, and each group may include one or more cells.

Therefore, the configuration signaling may further include information indicating that the N cells in the M cells are configured as a group. In this case, the channel status request signaling may include a group identifier of the group. When the base station considers that reporting of CSI of a cell group needs to be activated, the channel status request signaling may be used to instruct the UE to report CSI of a cell in the cell group. In this case, the channel status request signaling may include a group identifier indicating a cell group to be activated, and the cell group to be activated may be explicitly or implicitly indicated in the channel status request signaling. For example, a radio network temporary identifier is used to indicate a cell group, or the UE may deduce, according to a cell for which the channel status request signaling is received and a cell group to which the cell belongs, a cell group whose channel status is instructed by the base station to be reported.

In addition, the channel status request signaling may further include a physical resource block and an MCS, where CSI is reported by using the PRB resource, and CSI is reported by the UE on a PUSCH channel by using the MCS. In a case in which cells used by the UE are managed by multiple base stations, it is assumed that the N cells herein are separately managed by the base station A and the base station B. If the base station A sends channel status request signaling, the channel status request signaling includes PRB resources separately used by the base station A and the base station B for reporting CSI and MCSs separately used by the base station A and the base station B.

Therefore, the receiving unit 12 is specifically configured to receive the CSI of the cell that is in the N cells and that is managed by the base station, where the CSI is transmitted by the UE on the PRB according to the reporting period by using the modulation and coding scheme.

Optionally, in an LTE system, at an interval of 4 ms after the channel status request signaling is received, that is, in the fourth subframe, the UE starts to transmit CSI of a cell in a specified cell group on a specified PRB, and periodically reports CSI in each reporting period.

According to the solution for reporting a channel status in this implementation, a PUSCH channel resource can be used to periodically report CSI of multiple cells used by the UE, and implementation of this solution is simple and reliable.

In another implementation, the base station does not need to preconfigure a cell group. The base station only needs to notify the UE of the reporting period and a channel quality indicator-temporary identifier CQI-RNTI (optional) in advance by transmitting the configuration signaling. Optionally, each of the M cells has one index identifier, and the index identifier is specified in a logic sequence. When the UE is instructed to perform CSI reporting, the base station may send the channel status request signaling to the UE by using a PDCCH, and add an index identifier of a cell, that is, cell Idx to the channel status request signaling. After receiving the channel status request signaling, the UE starts to report the CSI of the N cells, where the N cells are N activated cells, following a cell indicated by the specified cell Idx, indicated in the logic sequence. For example, FIG. 2 is a schematic diagram of reporting channel state information by UE. It is assumed that the UE has 14 activated cells 0, 1, 3, 5, 12, 14, 22, 23, 24, 27, 28, 29, 30, and 31, and the base station notifies, by using a DCI format 0, that is, a DCI 0, the UE that cell Idx=3. In this case, the UE starts to periodically send CSI of five cells 3, 5, 12, 14, and 22, and N is equal to 5 herein. In addition, the base station may add an index of the last cell to the channel status request signaling. After receiving the channel status request signaling, the UE starts to determine a specified quantity of activated cells preceding a cell indicated by the specified cell Idx, and reports CSI of the specified quantity of the cells. That is, the specified cells herein are N consecutive activated cells, starting from a cell indicated by the index identifier, indicated in the index identifier logic sequence.

In still another implementation, the base station may indicate a cell list in the channel status request signaling, and the UE sends CSI of a cell in the list.

In still another implementation, the base station may add a bitmap to the channel status request signaling, and the bitmap is used to indicate cells whose CSI is to be sent by the UE. For example, 32 cells may be corresponding to 32 bits. If a bit value corresponding to a cell is 0, it indicates that the UE does not need to send CSI of the cell. If a bit value corresponding to a cell is 1, it indicates that the UE needs to send CSI of the cell.

According to the solution in this implementation, without a need to configure a cell group, the base station can rapidly specify a UE feedback, and can request, at any time according to a requirement, the UE to feed back a cell status report required by the base station.

Optionally, the channel status request signaling sent by the base station to the UE is channel status request signaling scrambled by using a semi-persistent scheduling-temporary identifier (SPS-RNTI). An allocation message carries an SPS-RNTI identifier. The UE obtains an uplink resource corresponding to an SPS-RNTI identifier of the UE, and deduces, according to a combination of an MCS and a quantity of PRBs allocated by the base station, that the resource is used to transmit CSI.

Optionally, when the base station considers that reporting of CSI of a cell group needs to be activated, the base station allocates the uplink resource by using the SPS-RNTI identifier of the UE. In addition, the channel status request signaling is indicated in the channel status request signaling to enable the UE to periodically transmit CSI, instead of reporting an SPS. An implicit indication or an explicit indication may be performed by using the combination of an MCS and a quantity of PRBs allocated by the base station. For example, if a particular PRB is combined with a particular MCS, it indicates that the base station requests the UE to send only CSI, instead of uplink data or uplink data and CSI.

After receiving the channel status request signaling scrambled by using the SPS-RNTI, the UE determines, according to the explicit indication or the combination of a modulation and coding scheme and a quantity of included PRBs, that CSI reporting is activated, learns of a cell or cells whose CSI needs to be obtained by the base station, and periodically reports the CSI in a subsequent subframe.

According to the technical solution in this implementation, an original SPS-RNTI may be reused to activate the UE to periodically report CSI of a cell group. In this way, the UE can be activated to periodically report CSI of a cell group, without a need to allocate a dedicated CSI-RNTI to the UE.

Still referring to FIG. 11, control of reporting of CSI of a deactivated cell is added on the basis of the foregoing embodiment. In this embodiment, at least one cell that is in the N cells and that is managed by the base station is deactivated in any reporting period. The base station still requests the UE to report the CSI of the N cells. However, a value of reported CSI of the deactivated cell is a preset value, and the preset value is used to indicate that the at least one cell is deactivated. This embodiment of the present invention may include all the content of the embodiment in FIG. 11.

In addition, the sending unit 11 is further configured to retransmit the channel status request signaling to the UE.

The receiving unit 12 is specifically configured to receive CSI of a cell that is in the N cells other than the deactivated cell and that is managed by the base station, where the CSI is transmitted by the UE according to the reporting period.

Specifically, when the base station instructs the UE to periodically report CSI of a cell group, the UE determines an activated cell in the cell group, and reports the activated cell in the cell group. If a cell is deactivated in the reporting period, the UE sets a value of CSI of the deactivated cell to the preset value for reporting.

Optionally, the preset value is out of range (OOR).

As shown in FIG. 4, the base station requests, by using a DCI 0, the UE to report CSI of cells 7, 8, 9, 10, and 13, and the UE starts to periodically report the CSI corresponding to the cells 7, 8, 9, 10, and 13. For example, if the cell 8 is deactivated at a time point after the UE is activated, the UE sets a value of CSI of the cell 8 to the OOR when performing reporting in each subsequent period. Optionally, if the DCI 0 that is used to request to report the CSI of the cells 7, 8, 9, 10, and 13 and that is sent by the base station is received by the UE again, the UE reports only CSI of the cells 7, 9, 10, and 13 without the CSI of the cell 8.

According to the solution in this implementation, control of reporting of CSI of a deactivated cell is added, so that the base station can flexibly control a reporting action of the UE.

Still referring to FIG. 11, different from the foregoing embodiment, in this implementation, control of reporting of CSI of a deactivated cell is added on the basis of the foregoing embodiment, and the deactivated cell herein means that all cells in a cell group are deactivated. Therefore, the base station may include all the content of the embodiment in FIG. 11, and the sending unit 11 is further configured to: if all the N cells are deactivated in any reporting period, send channel status reporting stop signaling to the UE, where the channel status reporting stop signaling is used to instruct the UE to stop reporting the CSI of the N cells.

Optionally, the channel status reporting stop signaling sent by the base station to the UE may be a PDCCH instruction. As shown in FIG. 6, an axis direction is a forward time direction. After a first DCI 0 on the left is triggered, all the N cells 7, 8, 9, 10, and 13 are deactivated, and the UE no longer reports the CSI of these cells. When another DCI sent by the base station is received by the UE, that is, when a second DCI 0 on the left in FIG. 6 is triggered, the UE no longer reports the CSI in this period. In this way, a reporting action of the UE can be optimized, and resources can be reclaimed in a timely manner.

Optionally, the receiving unit 12 is further configured to receive uplink data transmitted by the UE on the PRB.

In this implementation, PUSCH resource reuse is further added. As shown in FIG. 7, if channel status request signaling is used to request to deactivate the cells 7, 8, 9, 10, and 13 whose CSI is to be reported, the UE no longer reports the CSI of these cells. However, because the PUSCH resource is idle, the UE may send the uplink data by using the resource. In this way, the UE can make full use of an uplink resource.

Figure 12:
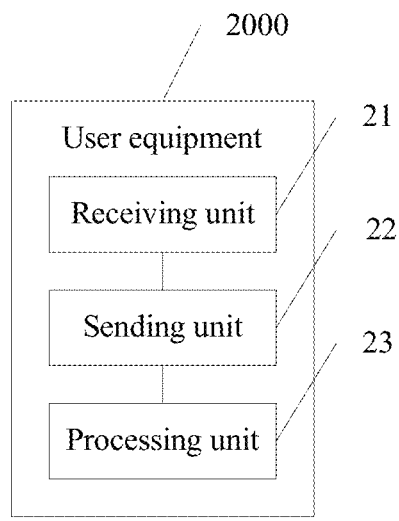
FIG. 12 is a schematic structural diagram of a user equipment according to an embodiment of the present invention.

Referring to FIG. 12, FIG. 12 is a schematic structural diagram of a user equipment according to an embodiment of the present invention. The user equipment UE uses M cells to transmit data, and the user equipment includes a receiving unit 21 and a sending unit 22, and may further include a processing unit 23.

The receiving unit 21 is configured to receive configuration signaling transmitted by the base station, where the configuration signaling includes a reporting period of channel state information CSI of N cells in the M cells.

The base station transmits the configuration signaling to the UE. The configuration signaling may be semi-persistent scheduling signaling, the configuration signaling may be sent to the UE by using RRC layer signaling, Medium Access Control layer signaling, or other higher layer signaling, and the configuration signaling includes a period of reporting CSI of multiple cells by the UE.

The receiving unit 21 receives the configuration signaling transmitted by the base station.

It should be noted that, the M cells herein may be managed by a same base station or may be managed by multiple base stations. For example, the UE uses 32 cells, where 10 cells are managed by a base station A and the other 22 cells are managed by a base station B. Certainly, there may be more than two base stations. Configuration signaling of the N cells may be transmitted by one base station to the UE.

The receiving unit 21 is further configured to receive channel status request signaling transmitted by the base station, where the channel status request signaling is used to instruct the UE to report the CSI of the N cells in the M cells; and M is an integer greater than 1, N is an integer greater than or equal to 1, and N≤M.

In this embodiment of the present invention, the UE does not need to report CSI of all cells used by the UE. When the base station considers that reporting of CSI of a specified cell used by the UE needs to be activated, the channel status request signaling may be sent to instruct the UE to report the CSI of the specified cell. The channel status request signaling may be downlink control information (DCI). The UE may report the CSI according to the reporting period by using a PUSCH channel. The receiving unit 21 receives the channel status request signaling transmitted by the base station, and parses the signaling to indicate specified cells whose CSI is to be reported by the UE.

In a case in which cells used by the UE are managed by multiple base stations, a part of the N specified cells herein may be managed by the base station A, and the other part of the cells may be managed by the base station B. The channel status request signaling may be sent by the base station A or the base station B, or may be sent by different base stations. The base station A may request CSI of a cell managed by the base station A, and the base station B may request CSI of a cell managed by the base station B.

The sending unit 22 is configured to transmit, to the base station according to the reporting period, CSI of a cell that is in the N cells and that is managed by the base station.

After the receiving unit 21 receives the channel status request signaling of the base station, the sending unit 22 periodically reports the CSI of the specified cell to the base station according to the period in the configuration signaling, and the CSI may be sent by using the PUSCH. The base station receives the CSI of the specified cell. Certainly, the specified cell may be all cells used by the UE, or some cells used by the UE.

In a case in which cells used by the UE are managed by multiple base stations, the UE transmits CSI of a cell managed by the base station A to the base station A, and the UE transmits CSI of a cell managed by the base station B to the base station B.

Because CSI of all cells specified by the base station can be reported at a time, reporting efficiency is greatly improved. CSI is periodically reported, and therefore, the base station does not need to continuously allocate PUSCH resources to the UE, and does not need to continuously instruct the UE to transmit CSI together with data. This saves a large quantity of PDCCH resources and PUSCH resources.

Therefore, according to the user equipment provided in this embodiment of the present invention, the base station configures the reporting period of transmitting channel state information by the UE, and sends the channel status request signaling to the UE, to instruct the UE to report channel state information of a specified cell, and the UE transmits the channel state information of the specified cell to the base station, so that the base station can reliably obtain a channel status of a cell in a timely manner with low costs, and can efficiently arrange sending of downlink data.

In an implementation, the base station may preconfigure multiple cell groups, and each group may include one or more cells.

Therefore, the configuration signaling may further include information indicating that the N cells in the M cells are configured as a group. In this case, the channel status request signaling may include a group identifier of the group. When the base station considers that reporting of CSI of a cell group needs to be activated, the channel status request signaling may be used to instruct the UE to report CSI of a cell in the cell group. In this case, the channel status request signaling may include a group identifier indicating a cell group to be activated, and the cell group to be activated may be explicitly or implicitly indicated in the channel status request signaling. For example, a radio network temporary identifier is used to indicate a cell group, or the UE may deduce, according to a cell for which the channel status request signaling is received and a cell group to which the cell belongs, a cell group whose channel status is instructed by the base station to be reported.

In addition, the channel status request signaling may further include a physical resource block (PRB) and an MCS, where CSI is reported by using the PRB resource, and CSI is reported by the UE on a PUSCH channel by using the MCS. In a case in which cells used by the UE are managed by multiple base stations, it is assumed that the N cells herein are separately managed by the base station A and the base station B. If the base station A sends channel status request signaling, the channel status request signaling includes PRB resources separately used by the base station A and the base station B for reporting CSI and MCSs separately used by the base station A and the base station B.

Therefore, the sending unit 22 is specifically configured to transmit, to the base station on the PRB according to the reporting period by using the modulation and coding scheme, the CSI of the cell that is in the N cells and that is managed by the base station.

Optionally, in an LTE system, at an interval of 4 ms after the channel status request signaling is received, that is, in the fourth subframe, the UE starts to transmit CSI of a cell in a specified cell group on a specified PRB, and periodically reports CSI in each reporting period.

In the manner of reporting a channel status in this implementation, a PUSCH channel resource can be used to periodically report CSI of multiple cells used by the UE, and implementation of this manner is simple and reliable.

In another implementation, the base station does not need to preconfigure a cell group. The base station only needs to notify the UE of the reporting period and a channel quality indicator-temporary identifier CQI-RNTI (optional) in advance by transmitting the configuration signaling. Optionally, each of the M cells has one index identifier, and the index identifier is specified in a logic sequence. When the UE is instructed to perform CSI reporting, the base station may send the channel status request signaling to the UE by using a PDCCH, and add an index identifier of a cell, that is, cell Idx to the channel status request signaling. After receiving the channel status request signaling, the UE starts to report the CSI of the N cells, where the N cells are N activated cells, following a cell indicated by the specified cell Idx, indicated in the logic sequence. For example, FIG. 2 is a schematic diagram of reporting channel state information by UE. The UE has 14 activated cells 0, 1, 3, 5, 12, 14, 22, 23, 24, 27, 28, 29, 30, and 31, and the base station notifies, by using a DCI 0, the UE that cell Idx=3. In this case, the UE starts to periodically send CSI of five cells 3, 5, 12, 14, and 22, and N is equal to 5 herein. In addition, the base station may add an index of the last cell to the channel status request signaling. After receiving the channel status request signaling, the UE starts to determine a specified quantity of activated cells preceding a cell indicated by the specified cell Idx, and reports CSI of the specified quantity of the cells. That is, the specified cells herein are N consecutive activated cells, starting from a cell indicated by the index identifier, indicated in the index identifier logic sequence.

In still another implementation, the base station may indicate a cell list in the channel status request signaling, and the UE sends CSI of a cell in the list.

In still another implementation, the base station may add a bitmap to the channel status request signaling, and the bitmap is used to indicate cells whose CSI is to be sent by the UE. For example, 32 cells may be corresponding to 32 bits. If a bit value corresponding to a cell is 0, it indicates that the UE does not need to send CSI of the cell. If a bit value corresponding to a cell is 1, it indicates that the UE needs to send CSI of the cell.

According to the solution in this implementation, without a need to configure a cell group, the base station can rapidly specify a UE feedback, and can request, at any time according to a requirement, the UE to feed back a cell status report required by the base station.

Optionally, the channel status request signaling sent by the base station to the UE is channel status request signaling scrambled by using a semi-persistent scheduling-temporary identifier (SPS-RNTI). An allocation message carries an SPS-RNTI identifier. The UE obtains an uplink resource corresponding to an SPS-RNTI identifier of the UE, and deduces, according to a combination of an MCS and a quantity of PRBs allocated by the base station, that the resource is used to transmit CSI. Alternatively, there may be an explicit indication.

When the base station considers that reporting of CSI of a cell group needs to be activated, the base station allocates the uplink resource by using the SPS-RNTI identifier of the UE. In addition, the channel status request signaling is indicated in the channel status request signaling to enable the UE to periodically transmit CSI, instead of reporting an SPS. An implicit indication or an explicit indication may be performed by using the combination of an MCS and a quantity of PRBs allocated by the base station. For example, if a particular PRB is combined with a particular MCS, it indicates that the base station requests the UE to send only CSI, instead of uplink data or uplink data and CSI.

After receiving the channel status request signaling scrambled by using the SPS-RNTI, the UE determines, according to the combination of a modulation and coding scheme and a quantity of included PRBs, that CSI reporting is activated, learns of a cell or cells whose CSI needs to be obtained by the base station, and periodically reports the CSI in a subsequent subframe.

According to the technical solution in this implementation, an original SPS-RNTI may be reused to activate the UE to periodically report CSI of a cell group. In this way, the UE can be activated to periodically report CSI of a cell group, without a need to allocate a dedicated CSI-RNTI to the UE.

Still referring to FIG. 12, different from the foregoing embodiment, control of reporting of CSI of a deactivated cell is added on the basis of the foregoing embodiment. In this embodiment, at least one of the N cells is deactivated in any reporting period. The sending unit 22 still reports the CSI of the N cells. However, a value of reported CSI of the deactivated cell is a preset value, and the preset value is used to indicate that the at least one cell is deactivated. This embodiment of the present invention may include all the content of the embodiment of the user equipment.

In addition, the receiving unit 21 is further configured to receive an instruction that is used to deactivate at least one of the N cells and that is transmitted by the base station.

The sending unit 22 is specifically configured to transmit, to the base station according to the reporting period, the CSI of the cell that is in the N cells and that is managed by the base station, where a value of reported CSI of the at least one deactivated cell is a preset value, and the preset value is used to indicate that the at least one cell is deactivated.

Specifically, when the base station instructs the UE to periodically report CSI of a cell group, the UE determines an activated cell in the cell group, and reports the activated cell in the cell group. If a cell is deactivated in the reporting period, the UE sets a value of CSI of the deactivated cell to the preset value for reporting.

Optionally, the preset value is out of range (OOR).

As shown in FIG. 4, the base station requests, by using a DCI, the UE to report CSI of cells 7, 8, 9, 10, and 13, and the UE starts to periodically report the CSI corresponding to the cells 7, 8, 9, 10, and 13. For example, if the cell 8 is deactivated at a time point after the UE is activated to periodically report the CSI, the UE sets a value of CSI of the cell 8 to the OOR when performing reporting in each subsequent period. Optionally, if the DCI that is used to request to report the CSI of the cells 7, 8, 9, 10, and 13 and that is sent by the base station is received by the UE again, the UE reports only CSI of the cells 7, 9, 10, and 13 without the CSI of the cell 8.

That is, the receiving unit 21 is further configured to receive the channel status request signaling retransmitted by the base station.

The sending unit 22 is further configured to transmit CSI of a cell in the N cells other than the deactivated cell to the base station according to the reporting period.

According to the solution in this implementation, control of reporting of CSI of a deactivated cell is added, so that the base station can flexibly control a reporting action of the UE.

Still referring to FIG. 12, different from the foregoing embodiment, in this implementation, control of reporting of CSI of a deactivated cell is added on the basis of the foregoing embodiment, and the deactivated cell herein means that all cells in a cell group are deactivated. Therefore, in addition to all the content of the foregoing embodiment, the method includes the following content:

The sending unit 22 is further configured to stop transmitting the CSI of the N cells to the base station.

The processing unit 23 is configured to: from a next period of any reporting period, continuously count a quantity of times of skipping transmitting the CSI of the N cells to the base station in each reporting period.

The sending unit 22 is further configured to: when a value of the counting reaches a first specified threshold, if the receiving unit receives the channel status request signaling transmitted by the base station, and the N cells are activated, terminate transmission of the CSI of the N cells to the base station.

If all the cells in the cell group are deactivated in any reporting period, the UE no longer sends CSI on a predetermined radio resource. In a next period, the UE starts to count a quantity of times of re-skipping sending CSI on the predetermined radio resource in each subsequent reporting period. If a quantity of occurrences of this case exceeds a threshold, the UE considers that the base station reclaims an uplink resource, and the UE skips sending CSI to the base station. After the sending is skipped, even if the base station device activates a cell in the cell group again, the UE no longer sends periodic CSI. In this way, a reporting action of the UE can be optimized, and resource deadlock can be prevented.

An implicit deactivation manner is described in the foregoing implementation. Certainly, there may be explicit deactivation, that is, the base station sends channel status reporting stop signaling to the UE, and the channel status reporting stop signaling is used to instruct the UE to stop reporting the CSI of the N cells. When receiving the channel status reporting stop signaling, the receiving unit 21 stops the reporting.

Optionally, the sending unit 22 is further configured to transmit uplink data to the base station on the PRB.

The processing unit 23 is further configured to continuously count a quantity of times of transmitting uplink data to the base station.

The processing unit 23 is further configured to: when a value of the counting reaches a second specified threshold, determine that the base station cancels the allocated PRB.

In this implementation, PUSCH resource reuse is further added. As shown in FIG. 7, in any reporting period, if channel status request signaling is used to request to deactivate the N cells whose CSI is to be reported, the UE no longer reports the CSI. However, because the PUSCH resource is idle, the UE sends the uplink data by using the resource. From a next period, the UE starts to count a quantity of times of resending uplink data on the uplink resource in each subsequent reporting period. When the value of the counting reaches the specified threshold, the UE may determine that the base station cancels the allocated uplink resource. In this way, the UE can make full use of an uplink resource.

Figure 13:
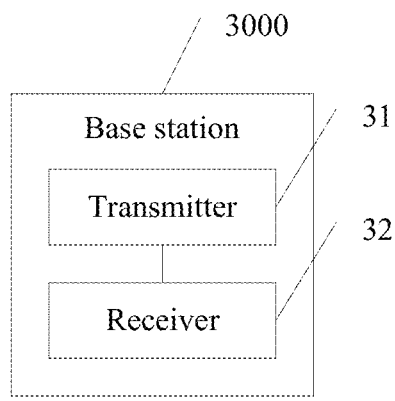
FIG. 13 is a schematic structural diagram of another base station according to an embodiment of the present invention.

Referring to FIG. 13, FIG. 13 is a schematic structural diagram of another base station according to an embodiment of the present invention. As shown in FIG. 13, a user equipment UE uses M cells to transmit data, and the base station 3000 may include a transmitter 31 and a receiver 32.

The transmitter 31 transmits configuration signaling to the UE, where the configuration signaling includes a reporting period of channel state information CSI of N cells in the M cells.

The transmitter 31 transmits channel status request signaling to the UE, where the channel status request signaling is used to instruct the UE to report the CSI of the N cells in the M cells.

The receiver 32 receives CSI of a cell that is in the N cells and that is managed by the base station, where the CSI is transmitted by the UE according to the reporting period.

M is an integer greater than 1, N is an integer greater than or equal to 1, and N≤M.

In an implementation, the configuration signaling further includes information indicating that the N cells in the M cells are configured as a group and a group identifier of the group.

The transmitted channel status request signaling specifically includes the group identifier.

In another implementation, each of the M cells has one index identifier, the index identifier is specified in a logic sequence, the channel status request signaling specifically includes an index identifier of one of the M cells, and the N cells are N consecutive activated cells, starting from a cell indicated by the index identifier, indicated in the index identifier logic sequence.

In still another implementation, the channel status request signaling further includes a physical resource block PRB and a modulation and coding scheme that are required to report the CSI of the N cells in the M cells.

That the receiver 32 performs the step of receiving CSI of a cell that is in the N cells and that is managed by the base station, where the CSI is transmitted by the UE according to the reporting period includes:

receiving the CSI of the cell that is in the N cells and that is managed by the base station, where the CSI is transmitted by the UE on the PRB according to the reporting period by using the modulation and coding scheme.

In still another implementation, the channel status request signaling is channel status request signaling scrambled by using a semi-persistent scheduling-temporary identifier SPS-RNTI.

In still another implementation, if at least one cell that is in the N cells and that is managed by the base station is deactivated in any reporting period, a value of CSI that is of the at least one cell and that is received by the base station is a preset value, and the preset value is used to indicate that the at least one cell is deactivated.

In still another implementation, the transmitter 31 retransmits the channel status request signaling to the UE.

The receiver 32 receives CSI of a cell that is in the N cells other than the deactivated cell and that is managed by the base station, where the CSI is transmitted by the UE according to the reporting period.

In still another implementation, if all the N cells are deactivated in any reporting period, the transmitter 31 sends channel status reporting stop signaling to the UE, where the channel status reporting stop signaling is used to instruct the UE to stop reporting the CSI of the N cells.

In still another implementation, if all the N cells are deactivated in any reporting period, the receiver 32 receives uplink data transmitted by the UE on the PRB.

According to the base station provided in this embodiment of the present invention, the base station configures the reporting period of transmitting channel state information by the UE, and sends the channel status request signaling to the UE, to instruct the UE to report channel state information of a specified cell, and the UE transmits the channel state information of the specified cell to the base station, so that the base station can reliably obtain a channel status of a cell in a timely manner with low costs, and can efficiently arrange sending of downlink data.

Figure 14:
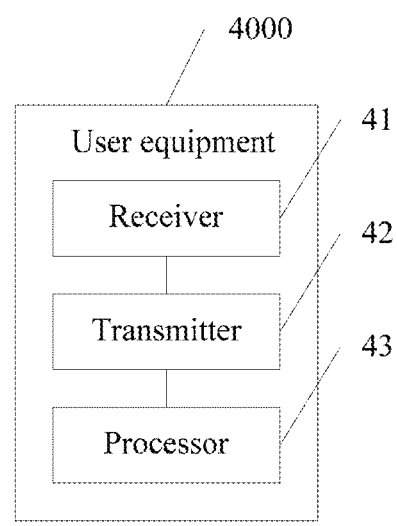
FIG. 14 is a schematic structural diagram of another user equipment according to an embodiment of the present invention.

Referring to FIG. 14, FIG. 14 is a schematic structural diagram of another user equipment according to an embodiment of the present invention. As shown in FIG. 14, the user equipment 4000 may include a receiver 41 and a transmitter 42, and may further include a processor 43. The user equipment uses M cells to transmit data.

The receiver 41 receives configuration signaling transmitted by the base station, where the configuration signaling includes a reporting period of channel state information CSI of N cells in the M cells.

The receiver 41 further receives channel status request signaling transmitted by the base station, where the channel status request signaling is used to instruct the UE to report the CSI of the N cells in the M cells.

The transmitter 42 transmits, to the base station according to the reporting period, CSI of a cell that is in the N cells and that is managed by the base station.

M is an integer greater than 1, N is an integer greater than or equal to 1, and N≤M.

In an implementation, the configuration signaling further includes information indicating that the N cells in the M cells are configured as a group and a group identifier of the group.

The transmitted channel status request signaling specifically includes the group identifier.

In another implementation, each of the M cells has one index identifier, the index identifier is specified in a logic sequence, the channel status request signaling specifically includes an index identifier of one of the M cells, and the N cells are N consecutive activated cells, starting from a cell indicated by the index identifier, indicated in the index identifier logic sequence.

In still another implementation, the channel status request signaling further includes a physical resource block PRB and a modulation and coding scheme that are required to report the CSI of the N cells in the M cells.

That the transmitter 42 performs the step of transmitting, to the base station according to the reporting period, CSI of a cell that is in the N cells and that is managed by the base station includes:

transmitting, to the base station on the PRB according to the reporting period by using the modulation and coding scheme, the CSI of the cell that is in the N cells and that is managed by the base station.

In still another implementation, the channel status request signaling is channel status request signaling scrambled by using a semi-persistent scheduling-temporary identifier SPS-RNTI.

In still another implementation, the receiver 41 further performs the following step:

receiving an instruction that is used to deactivate at least one of the N cells and that is transmitted by the base station.

That the transmitter 42 performs the step of transmitting, to the base station according to the reporting period, CSI of a cell that is in the N cells and that is managed by the base station includes:

transmitting, to the base station according to the reporting period, the CSI of the cell that is in the N cells and that is managed by the base station, where a value of reported CSI of the at least one deactivated cell is a preset value, and the preset value is used to indicate that the at least one cell is deactivated.

In still another implementation, the receiver 41 receives the channel status request signaling retransmitted by the base station.

The transmitter 42 transmits, to the base station according to the reporting period, CSI of a cell that is in the N cells other than the deactivated cell and that is managed by the base station.

In still another implementation, if all the N cells are deactivated in any reporting period, the transmitter 42 stops transmitting the CSI of the N cells to the base station;

from a next period, the processor 43 starts to continuously count a quantity of times of skipping transmitting the CSI of the N cells to the base station in each reporting period; and when a value of the counting reaches a first specified threshold, if the receiver 41 receives the channel status request signaling transmitted by the base station, and the N cells are activated, the transmitter 42 terminates transmission of the CSI of the N cells to the base station.

In still another implementation, the transmitter 42 further transmits uplink data to the base station on the PRB;

from a next period, the processor 43 starts to continuously count a quantity of times of transmitting uplink data to the base station in each reporting period; and when a value of the counting reaches a second specified threshold, the processor 43 determines that the base station cancels the allocated PRB.

According to the user equipment provided in this embodiment of the present invention, the base station configures the reporting period of transmitting channel state information by the UE, and sends the channel status request signaling to the UE, to instruct the UE to report channel state information of a specified cell, and the UE transmits the channel state information of the specified cell to the base station, so that the base station can reliably obtain a channel status of a cell in a timely manner with low costs, and can efficiently arrange sending of downlink data.

It should be noted that, for brief description, the foregoing method embodiments are represented as a series of actions. However, a person skilled in the art should appreciate that the present invention is not limited to the described order of the actions, because according to the present invention, some steps may be performed in other orders or simultaneously. In addition, a person skilled in the art should also appreciate that all the embodiments described in the specification are example embodiments, and the related actions and modules are not necessarily mandatory to the present invention.

In the foregoing embodiments, the description of each embodiment has respective focuses. For a part that is not described in detail in an embodiment, refer to related descriptions in other embodiments.

A sequence of the steps of the method in the embodiments of the present invention may be adjusted, and certain steps may also be merged or removed according to an actual need.

Merging, division, and removing may be performed on the units in the embodiments of the present invention according to an actual need. A person skilled in the art may integrate or combine different embodiments described in this specification and features of the different embodiments.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is taken as an example but is not limited: The computer readable medium may include a random access memory (RAM), a read-only memory (ROM), an electrically erasable programmable read-only memory (EEPROM), a compact disc read-only memory (CD-ROM) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A method for reporting a channel status, the method comprising:

transmitting, by a base station, configuration signaling to a user equipment (UE), wherein the configuration signaling comprises a reporting period of channel state information (CSI), and wherein the configuration signaling is signaling for semi-persistently reporting the CSI;

transmitting, by the base station, channel status request signaling scrambled by a dedicated channel state information-radio network temporary identifier (CSI-RNTI) to the UE for instructing the UE to report the CSI, wherein the channel status request signaling comprises a physical resource block (PRB) and a modulation and coding scheme for reporting the CSI; and receiving, by the base station, the CSI, wherein the CSI is transmitted according to the reporting period, on the PRB, and using the modulation and coding scheme.

2. The method according to claim 1, wherein if a cell through which the CSI is received is deactivated in any reporting period, a value of the CSI is a preset value for indicating the cell is deactivated.

3. The method according to claim 1, wherein when a cell through which the CSI is received is deactivated in any reporting period, the method further comprises sending, by the base station, channel status reporting stop signaling to the UE for instructing the UE to stop reporting the CSI.

4. The method according to claim 1, wherein the CSI is received on physical uplink shared channel (PUSCH).

5. The method according to claim 1, wherein a resource for the CSI is semi-persistent.

6. A method for reporting a channel status, the method comprising:

receiving, by a user equipment (UE), configuration signaling from a base station, wherein the configuration signaling comprises a reporting period of channel state information (CSI), and wherein the configuration signaling is signaling for semi-persistently reporting the CSI;

receiving, by the UE, channel status request signaling scrambled by a dedicated channel state information-radio network temporary identifier (CSI-RNTI) from the base station for instructing the UE to report the CSI, wherein the channel status request signaling comprises a physical resource block (PRB) and a modulation and coding scheme for reporting the CSI; and transmitting, by the UE to the base station according to the reporting period, the CSI, wherein the CSI is transmitted on the PRB using the modulation and coding scheme.

7. The method according to claim 6, further comprising receiving, by the UE from the base station, an instruction for deactivating a cell through which the CSI is transmitted, wherein a value of the CSI is a preset value for indicating the cell is deactivated.

8. The method according to claim 6, wherein when a cell through which the CSI is transmitted is deactivated in any reporting period, the method further comprises:

stopping, by the UE, transmitting the CSI to the base station;

from a next period of any reporting period, starting, by the UE, to continuously count a quantity of times of skipping transmitting to the base station in each reporting period, the CSI; and terminating, by the UE, transmission of the CSI when a value of the counting reaches a first specified threshold, when the UE receives the channel status request signaling from the base station, and when the cell is activated.

9. The method according to claim 6, wherein the CSI is received on physical uplink shared channel (PUSCH).

10. The method according to claim 6, wherein a resource for the CSI is semi-persistent.

11. A base station, comprising:

a processor; and a non-transitory computer-readable storage medium coupled to the processor and storing programming instructions which, when executed by the processor, instruct the processor to:

transmit configuration signaling to a user equipment (UE), wherein the configuration signaling comprises a reporting period of channel state information (CSI), and wherein the configuration signaling is signaling for semi-persistently reporting the CSI;

transmit channel status request signaling scrambled by a dedicated channel state information-radio network temporary identifier (CSI-RNTI) to the UE for instructing the UE to report the CSI, wherein the channel status request signaling comprises a physical resource block (PRB) and a modulation and coding scheme for reporting the CSI; and receive the CSI, wherein the CSI is transmitted according to the reporting period, on the PRB, and using the modulation and coding scheme.

12. The base station according to claim 11, wherein if a cell through which the CSI is received is deactivated in any reporting period, a value of the CSI is a preset value for indicating the cell is deactivated.

13. The base station according to claim 11, wherein when a cell through which the CSI is received is deactivated in any reporting period, the programming instructions, when executed by the processor, further instruct the processor to send channel status reporting stop signaling to the UE, wherein the channel status reporting stop signaling is used to instruct the UE to stop reporting the CSI.

14. The base station according to claim 11, wherein the CSI is transmitted on physical uplink shared channel (PUSCH).

15. The base station according to claim 11, wherein a resource for the CSI is semi-persistent.

16. A device, comprising:

a processor; and a non-transitory computer-readable storage medium coupled to the processor and storing programming instructions which, when executed by the processor, instruct the processor to:

receive configuration signaling e from a base station, wherein the configuration signaling comprises a reporting period of channel state information (CSI), and wherein the configuration signaling is signaling for semi-persistently reporting the CSI;

receive channel status request signaling scrambled by a dedicated channel state information-radio network temporary identifier (CSI-RNTI) from the base station for instructing the device to report the CSI, wherein the channel status request signaling comprises a physical resource block (PRB) and a modulation and coding scheme for reporting the CSI; and transmit, to the base station according to the reporting period, the CSI, wherein the CSI is transmitted on the PRB using the modulation and coding scheme.

17. The device according to claim 16, wherein the programming instructions, when executed by the processor, further instruct the processor to receive, from the base station, an instruction for deactivating a cell through which the CSI is transmitted, wherein a value of the CSI is a preset value for indicating the cell is deactivated.

18. The device according to claim 16, wherein the CSI is transmitted on physical uplink shared channel (PUSCH).

19. The device according to claim 16, wherein a resource for the UE to report the CSI is semi-persistent.

* * * * *